United States Patent [19]

Chu

[11] 4,093,823

[45] June 6, 1978

[54] STATISTICAL MULTIPLEXING SYSTEM FOR COMPUTER COMMUNICATIONS

[76] Inventor: Wesley W. Chu, 16794 Charmel La., Pacific Palisades, Calif. 90272

[21] Appl. No.: 812,802

[22] Filed: Jul. 5, 1977

Related U.S. Application Data

[63] Continuation-in-part of Ser. No. 717,341, Aug. 24, 1976, abandoned.

[51] Int. Cl.$^2$ .............................................. H04J 3/16
[52] U.S. Cl. ......................... 179/15 BA; 179/15 BW; 340/146.1 BA
[58] Field of Search ........ 179/15 BA, 15 AS, 15 BW; 340/172.5, 146.1 BA; 445/1

[56] References Cited

U.S. PATENT DOCUMENTS

| 3,560,936 | 2/1971 | Busch | 340/172.5 |
| 3,825,905 | 7/1974 | Allen | 445/1 |
| 3,927,268 | 12/1975 | Sciulli | 179/15 AS |
| 3,975,712 | 8/1976 | Hepworth | 179/15 BA |
| 3,988,674 | 10/1976 | Sciulli | 179/15 BS |

*Primary Examiner*—David L. Stewart
*Attorney, Agent, or Firm*—Keith D. Beecher

[57] ABSTRACT

A statistical multiplexing system is provided for computer communications, in which asynchronous user messages are transmitted from the individual terminals to the central processor, or other remote location, in random order. The messages are statistically multiplexed, with time slots being assigned in the communication channel as each message is received from the terminals, and with no time slots being assigned for idle periods, which greatly increases channel utilization. A buffer memory is required in the system to temporarily store messages from the terminals at statistical peaks. To improve channel efficiency, several characters for the same terminal may be collected together in the system to form an addressed data sub-block so as to reduce address label requirements. These sub-blocks are assembled into multiplexed data blocks by a microprocessor and stored in the buffer memory. To relieve the microprocessor load, data blocks are transferred from the memory to the transmitter via a direct memory access facility for transmission over the communication channel to the desired destinations. Input rejection controls are provided to avoid overflow of the buffer memory. A demultiplexer is provided in the system which handles multiplexed data blocks received from the remote location and which transfers the received blocks under the control of the microprocessor to the buffer memory by way of the direct memory access facility. The microprocessor initiates positive and negative acknowledgment signals which are sent to the remote location, and it then demultiplexes the correctly received multiplexed data blocks and transfers them to the appropriate output terminal interfaces for distribution to the terminals. The multiplexer is capable of multiplexing messages from both asynchronous and synchronous input terminals. The microprocessor schedules and multiplexes data blocks from synchronous terminals and from asynchronous terminals over the common communication channel to one or more remote locations.

49 Claims, 23 Drawing Figures

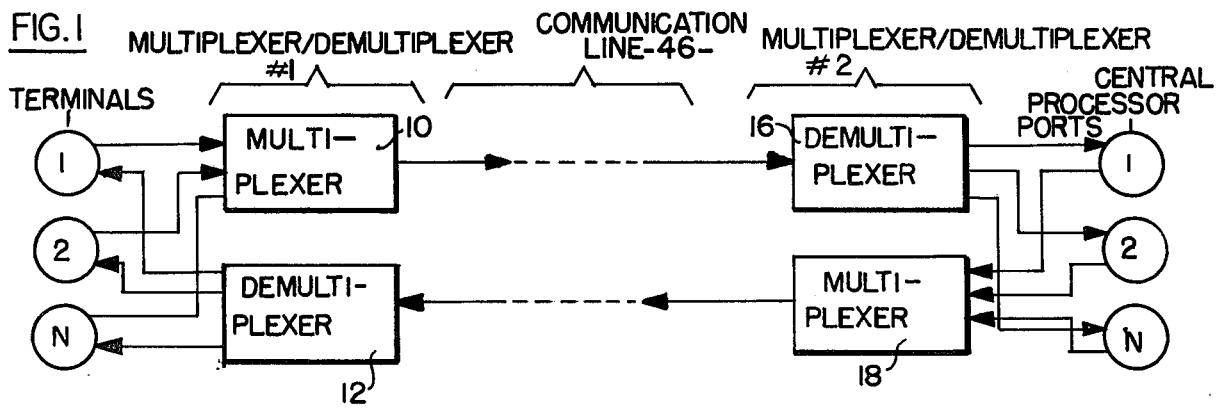
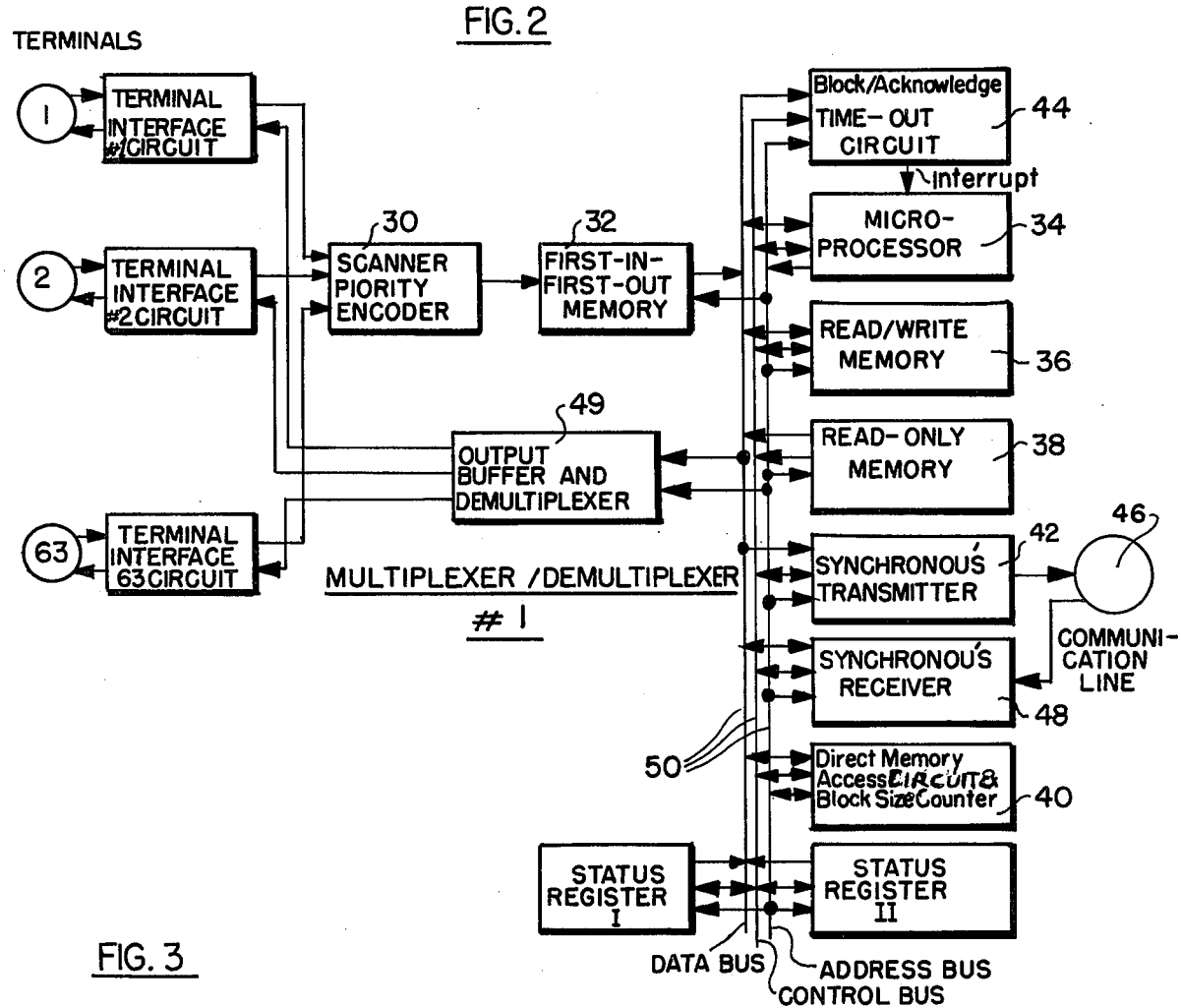
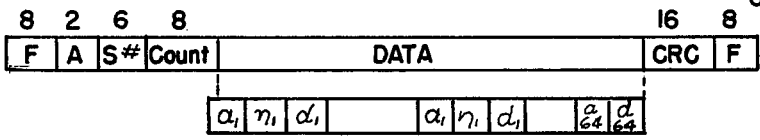
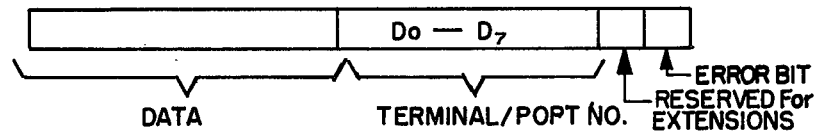

FIG. 4A

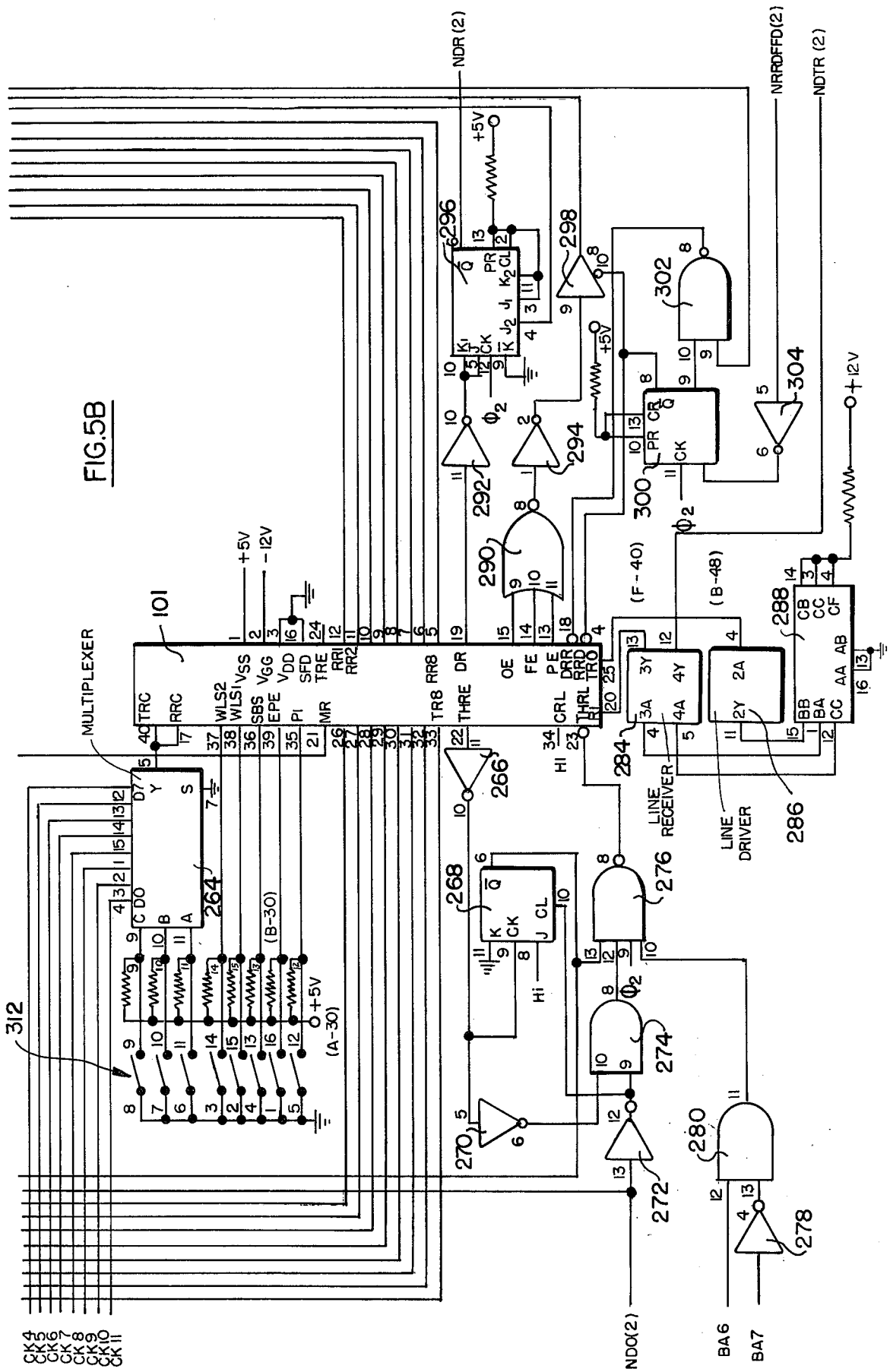

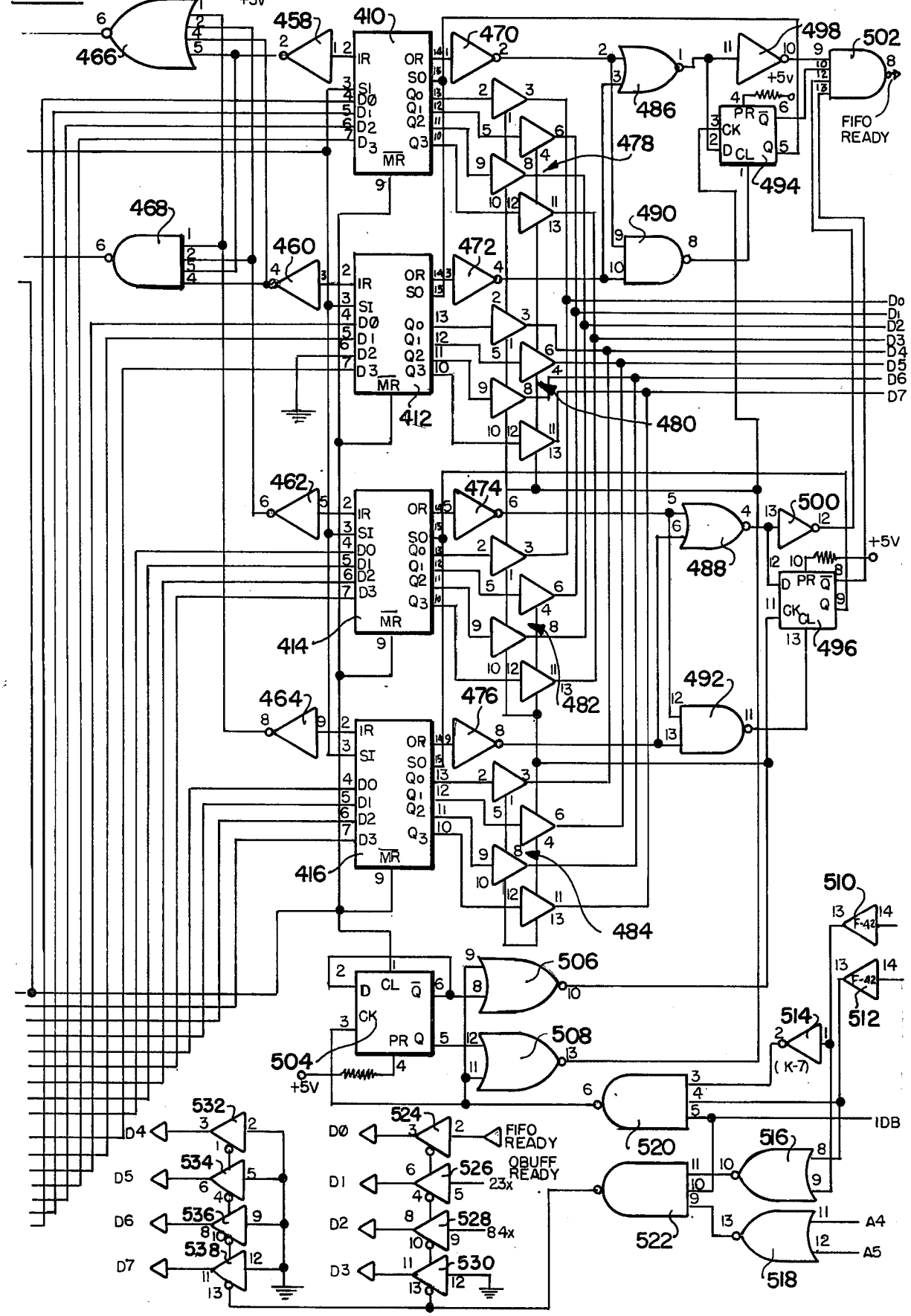

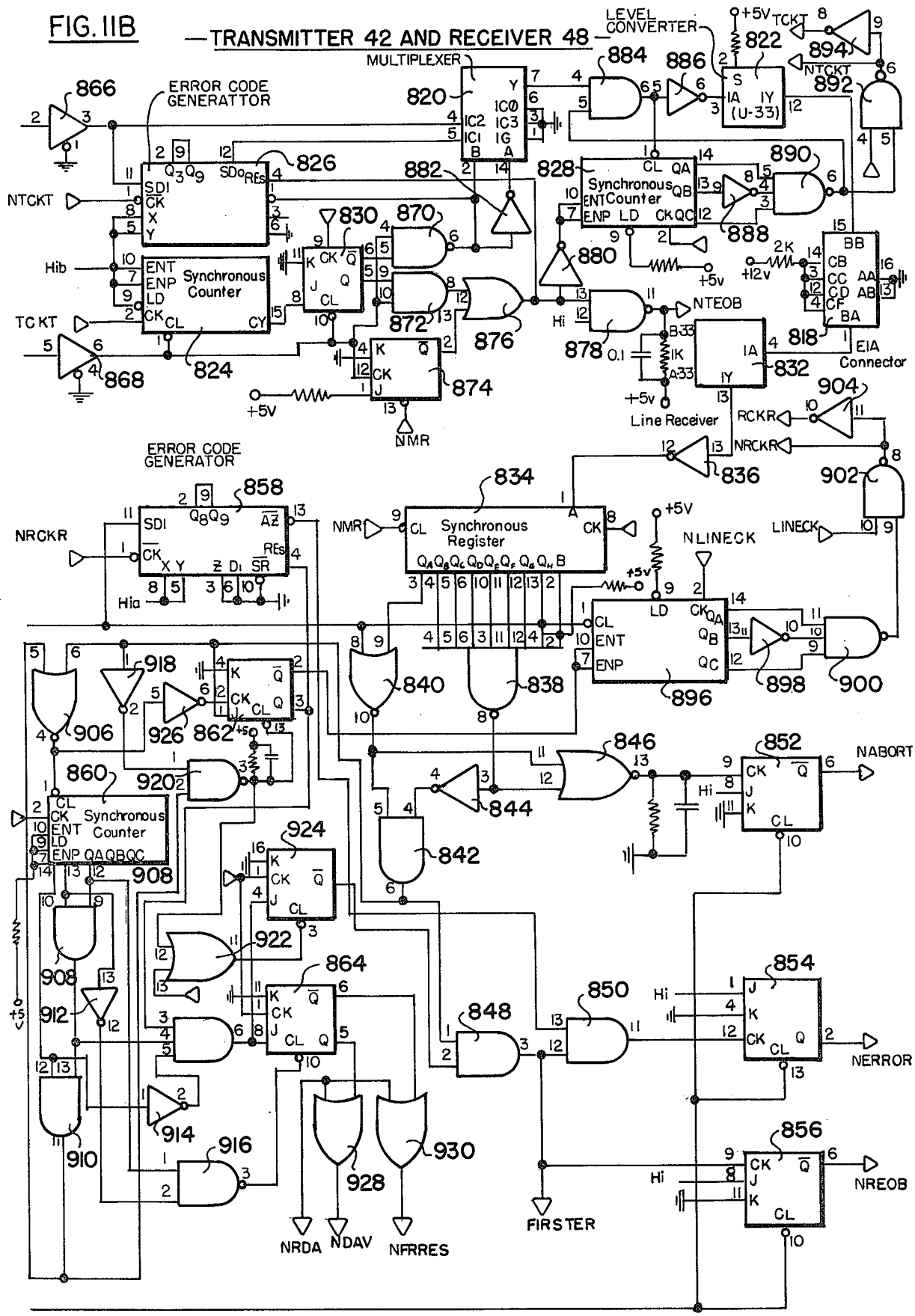
FIG. 11B — TRANSMITTER 42 AND RECEIVER 48 —

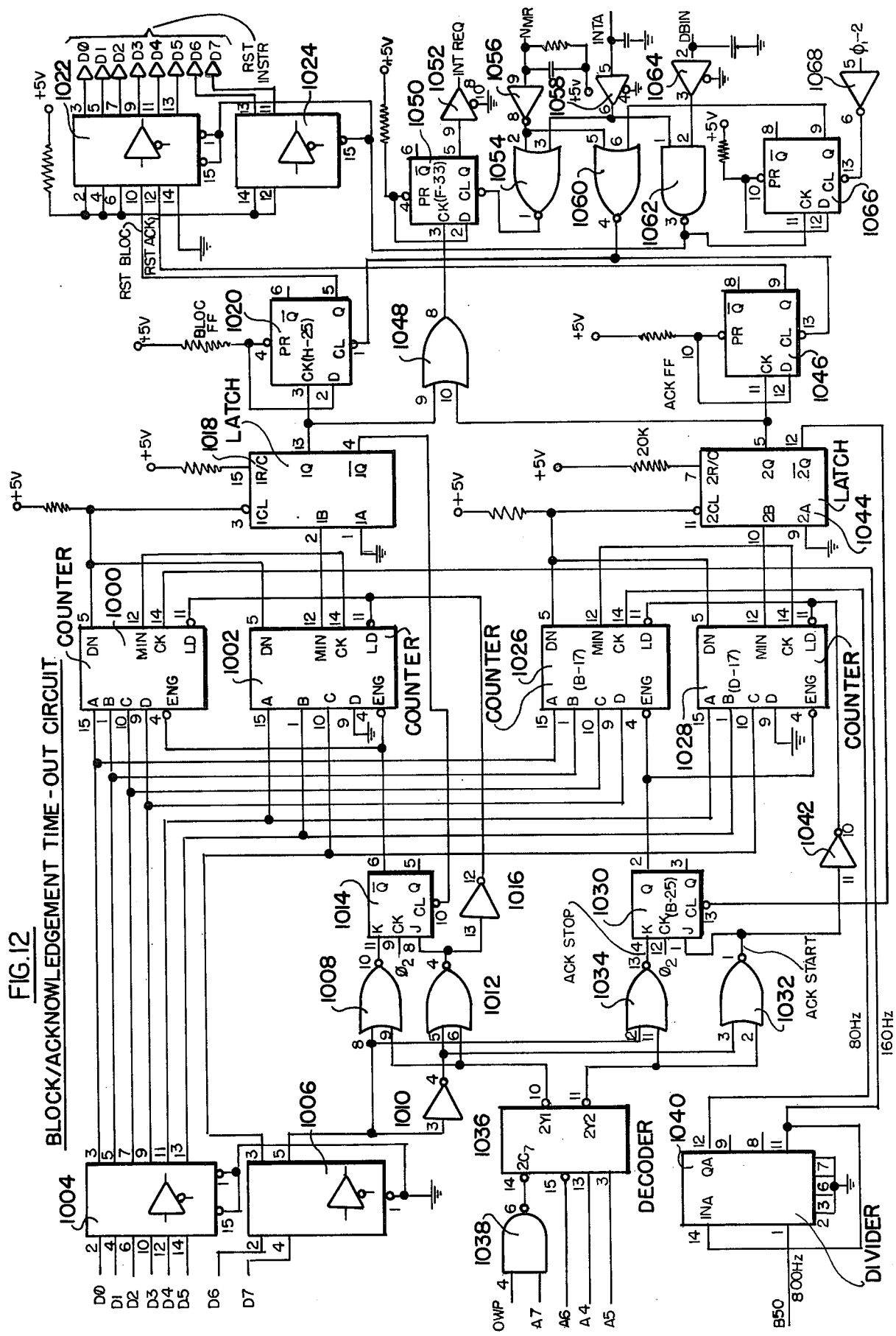
FIG.12 BLOCK/ACKNOWLEDGEMENT TIME-OUT CIRCUIT

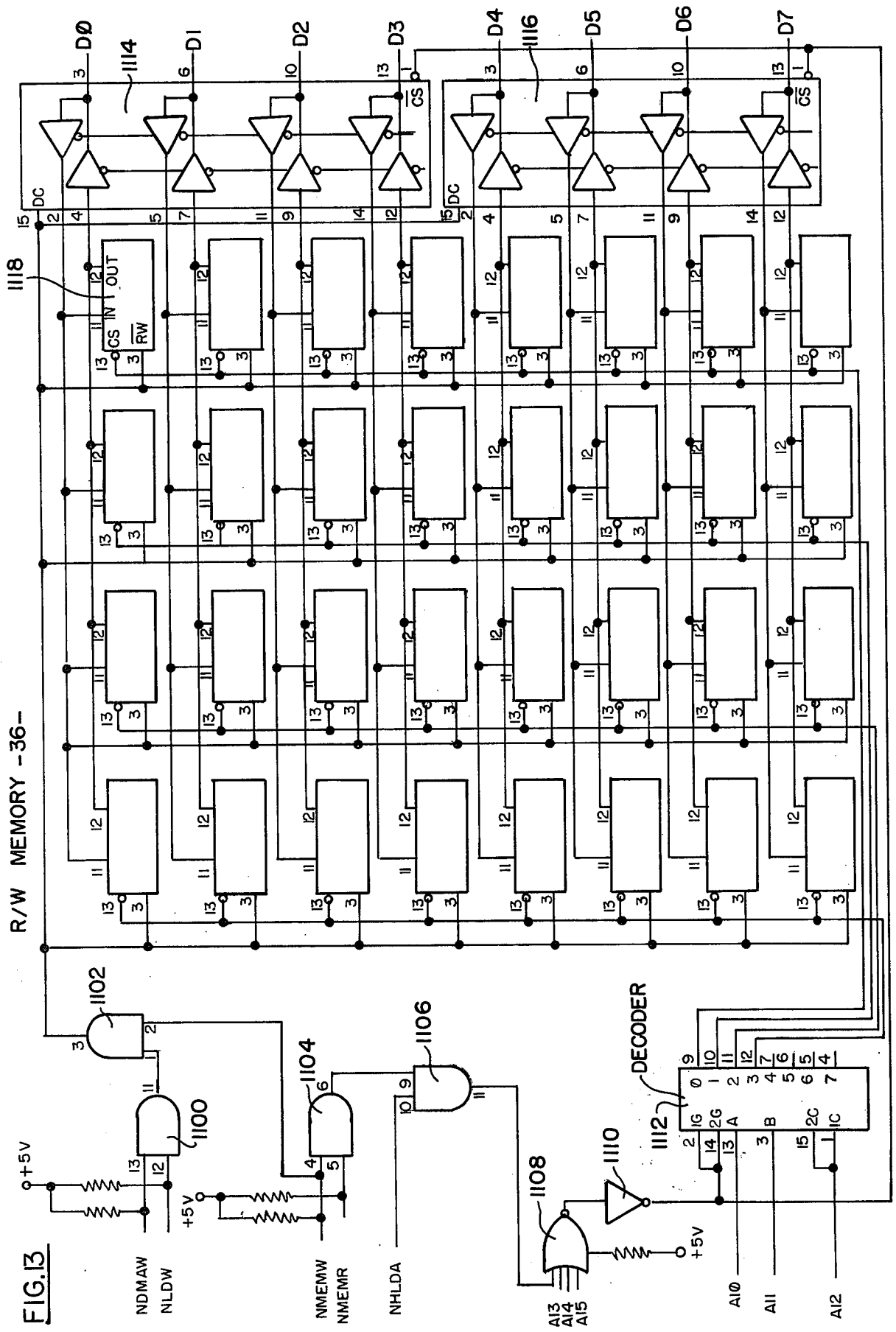

$A_S$ — SENDER ADDRESS
$A_D$ — DESTINATION ADDRESS

FIG.17

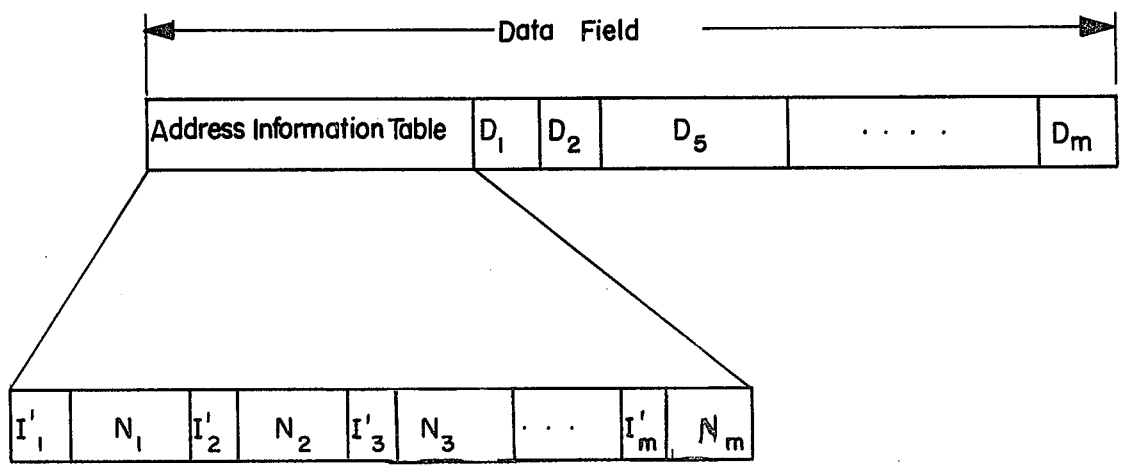

$I'_i$ = subblock indicator for the $i^{th}$ terminal; $I'_i = \begin{cases} 1 & \text{there is data from the } i^{th} \text{ terminal} \\ 0 & \text{no data from the } i^{th} \text{ terminal} \end{cases}$ $N_i$ = length of data subblock for the $i^{th}$ terminal m = total number of input terminals of the multiplexing system $D_i$ = data subblock from the $i^{th}$ terminal with length $N_i$

FIG. 18

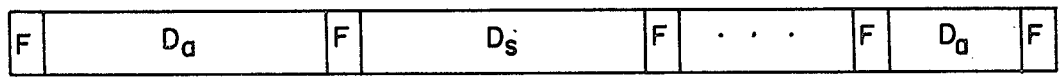

F = Flag (Synchronization Character) = 01111110

$D_s$ = data block from synchronous terminal interfaces $D_a$ = multiplexed data block from asynchronous terminal interfaces

STATISTICAL MULTIPLEXING SYSTEM FOR COMPUTER COMMUNICATIONS

This application is a continuation-in-part of copending application Ser. No. 717,341, filed Aug. 24, 1976 now abandoned.

BACKGROUND OF THE INVENTION

Synchronous time division multiplexing (STDM) is commonly used in the prior art in order to increase line utilization and efficiency in communications between the remote terminals and the central processor in time sharing data processing systems. In synchronous time division multiplexing, fixed time slots are assigned to each terminal, regardless of whether the particular terminal has a message to transmit or not. After one user's time interval has elapsed, the common communication line or channel between the individual terminals and the central processor is assigned to another user.

Since most terminals use only five percent of the total time, and are idle ninety-five percent of the total time, it is clear that the prior art synchronous time division multiplexing is inefficient insofar as the optimization of channel use is concerned. A more flexible and efficient system, namely asynchronous time division multiplexing (ATDM) has been introduced, which allocates a time slot in a common communication channel only when a terminal has a message to transmit. Unused channel bandwidth is available to support extra terminals. Since the multiplexed messages transmitted over the communication channel in the ATDM system are in a random order, such multiplexing is also known as statistical multiplexing. A somewhat similar multiplexing system has been used in voice communication. An operating example is the "Time Assignment Speech Interpolation" (TASI) system used by the Bell System on the Atlantic Ocean cable. Using the TASI system, the efficiency of transmission capacity has been doubled with negligible degradation in performance.

There are, however, two main differences in designing a statistical multiplexing system for voice and for computer data. In voice communication, there are many redundancies in speech; therefore, certain amounts of errors in speech can be tolerated without impairing the capability of the system to convey the entire conversation. However, in order to preserve the natural voice quality in the voice communication system, a real time requirement is important; that is, the voice signal should be presented in a continuous stream of information. In the data communication case, on the other hand, almost the opposite situation occurs. Usually there is no redundant data in data communications, but the reliability of the data is extremely important. However, message delays are not as critical in data communications as in voice communications, and variations in delays from one message to another are tolerable so long as the maximum message response delay is within a certain limit. Thus the approaches of designing the multiplexing system for these two types of systems are quite different.

In the speech case, because of the real time requirements, buffering is used for speech interpolation; and therefore, is only limited to one frame. Because of the real time requirements, no buffering can be used to store peak load traffic in the voice systems. As soon as the input is greater than the output communication channel bandwidth, the system immediately overflows and certain speech signals are lost. Since there are many redundancies in the speech conversations, as long as the loss is not too high, the speech quality can still be acceptable. In the data communication case, however, a much higher level of data accuracy is required, therefore, whenever the data communication system overflows, no data should be lost. Furthermore, computer traffic arrives in burst form, which implies that if there is an overflow, it could be an overflow of a large amount of data. To prevent such a loss, a large data buffer is required in the data communication system to temporarily store and handle the peak input traffic load. Input traffic rejection control mechanisms are also needed in the data communication system to prevent buffer overflow. Since the users response delay in the data communication system is less critical than in the voice communication system, data characters from the same source (terminal) may be grouped together and form a sub-block in order to save address overhead. Time out control mechanisms are required in the data communication system to prevent excessive response delays. Thus the statistical multiplexing systems for speech and data are quite different, in spite of the fact both systems try to efficiently utilize the idle periods in the communication channel.

Statistical multiplexing for computer communications involves a certain amount of complexity because every message transmitted over the common communication line must be accompanied by an address which identifies the terminal from which it originated, and because buffering is required to handle the random message arrivals at statistical peaks. To avoid buffer overflow, selectively input rejections are required when the buffer reach a certain maximum size or when a certain terminal has excess input traffic which could cause buffer overflow. Since most of the terminals use only five percent of the total time in the transmission of data to the central processor, only thirty percent of the total time in the reception of data from the central processor, with careful design, the performance improvements of statistical multiplexing systems over the synchronous time division multiplexing (STDM) system can be as high as three hundred to four hundred percent. In other words, for the same communication channel, up to three to four times the number of terminals can be supported in the statistical multiplexing system as compared with the conventional STDM system. The present invention is concerned with an implementation of the statistical multiplexing system for computer communications.

The statistical multiplexing system of the present invention consists of two integral parts: a multiplexer and a demultiplexer. In the multiplexer, messages received from the various terminals are labelled by addresses and are statistically multiplexed for transmission over a common communication channel to central processors or other remote systems. A multiplicity of the terminals are connected to the multiplexer, in which the received messages from the individual terminals are multiplexed on statistical multiplexing basis for transmission over the common channels to the remote central processors or multiplexers.

Each terminal is connected to the multiplexer through a separate interface circuit. Each message, or character, from the individual terminals is parity checked in its interface circuit and fed to the multiplexer. All characters received correctly from the individual terminals are echoed back to the users. If a character is not correctly received, as detected by a parity bit error, that character is not echoed back, and the user is made aware that the character must be retyped. It is to be noted that the foregoing is a local echo feature, which is different from the remote echo technique used by most of the prior art existing systems.

In the system of the invention, and unlike the prior art synchronous time division multiplexing system, time slots are assigned to each character received by the multiplexer, but no time slots are assigned for the idle terminals, and this greatly increases the channel utilization in the common output communication line. To handle traffic at the statistical peaks, a two-stage buffer memory is included in the multiplexer. In the first embodiment of the invention to be described, the first stage of the buffer consists of a first-in-first-out (FIFO) memory, and the second stage consists of a read/write (R/W) memory.

The FIFO serves to collect the randomly received characters from all the input terminals, each character including a start bit, a stop bit, and a parity bit. These bits are removed before the characters are fed into the FIFO, and the address label is added to each character, which identifies the terminal from which it was received. The contents of the FIFO are then fed to the second stage of the buffer memory, which is the R/W memory, in which they are formed into a data block for transmission. To improve line efficiency, several characters from the same terminal can be collected together in the R/W memory to form a sub-block, with all the characters being identified by a single address label, which reduces the address label requirements in the data structure. A microprocessor is included in the multiplexing system for such message handling.

The multiplexer also includes a block time-out circuit which serves to notify the microprocessor when a prescribed block time-out interval has elapsed since a first character was received by the R/W memory to form a sub-block. When a block time-out circuit causes all the sub-blocks which contain at least one data character to be chained together to form a data block. The resulting data block is transferred to a synchronous transmitter via a direct memory access (DMA) facility for transmission to the remote central processor or remote multiplexer over the common communication channel. The block time-out circuit prevents excessive response time delays. Should a data block be filled up to its maximum length before the time-out interval established by the block time-out circuit, that data block is immediately transmitted over the common communication channel to the remote central processor or multiplexer.

The DMA facility is an important feature in the present invention in that it provides direct transfer of data from the R/W memory to the synchronous transmitter without involving the microprocessor operation. The DMA not only provides a much higher data transfer rate but also greatly reduces the microprocessor load and thus significantly increases the throughput of the multiplexing system. The DMA operation is initiated by the microprocessor and terminates by the byte count of the block size that was loaded in the DMA facility.

The demultiplexer is also provided in the statistical multiplexing system of the invention, as mentioned above. The demultiplexer is coupled to individual terminals, so that messages for the individual terminals received from the central processor over the common communication channel in a statistical multiplexed format may be demultiplexed and directed to the terminals identified by the individual data sub-blocks.

The demultiplexer performs a zero delete (deletes the zero after five consecutive one's which was inserted by the synchronous transmitter), initiates the transfer of data from the synchronous receiver to the R/W memory via the DMA facility, performs error checking, and sets a status register. The microprocessor in response to the status of the status register, issues the appropriate acknowledgment message to the sender. The microprocessor then performs the necessary memory management functions; for example, it chains all the received data sub-blocks for the same terminal in the proper order and distributes the data sub-blocks to its corresponding terminal.

Continuous error detection and retransmission techniques are used in the system of the invention for error control. The system continuously transmits data blocks to the central processor or other remote location without waiting for the acknowledgment of the previously transmitted data blocks. The system holds on all the transmitted data blocks in the R/W memory, and the buffer space of a transmitted data block is released from the R/W memory only when the system receives a positive acknowledgment of that data block from the remote location. Incorrectly received data blocks are retransmitted by the system.

In addition to using positive acknowledgment to indicate correctly received data blocks from the remote location, a unique feature is incorporated into the system of the invention which involves sending negative acknowledgments to the remote location for incorrectly received data blocks. With negative acknowledgments, The system at the remote location is able to detect an error data block much faster than waiting for the acknowledgment time-out circuit to operate. Thus, the negative acknowledgment feature in the system of the invention improves the throughput and buffer utilization of the system. In the system of the invention, acknowledgment time-out is used for abnormal errors, for example, if a negative acknowledgment is lost during transmission.

This invention also included an alternative implementation of the first buffer memory of the statistical multiplexing system. Instead of using a centralized first buffer memory, a separate microcomputer providing a first buffer memory may be provided in each terminal interface circuit. Data sub-blocks from the same terminal may now be formed in each terminal interface circuit. Providing a first buffer memory at each terminal interface circuit greatly reduces the processing load of the multiplexer microprocessor for forming the data sub-blocks and thus provides a higher system throughput. The present-day availability of low cost microcomputers on LSI chips permits economical implementation of the aforesaid approach of using a microcomputer for each terminal interface.

In the alternative implementation, a scanner periodically initiates the transfer of the full or partially full sub-blocks with address and sub-block size count from the interface circuits to the second buffer memory (R/W memory) via the direct memory access (DMA) circuit. In the exact same manner as described previously, the microprocessor then collects all the received sub-blocks and multiplexes them into data blocks for transmission over the common communication channel to the remote locations.

In the demultiplexer of the alternative implementation, the buffer system consists of a dedicated buffer for each terminal and a shared buffer for storing data blocks when a dedicated individual buffer overflows. The microprocessor uses a unique technique to dynamically manage the received statistical multiplexed data blocks from the communication channel and to transfer the received data sub-blocks from the second buffer memory to the first buffer memories in the terminal interface circuits by way of the DMA circuit.

To protect data integrity and to prevent buffer overflow in the alternative implementation, traffic control mechanisms are incorporated with the aid of buffer occupancy status registers. With microprocessor control the system is capable of rejecting input traffic when the second buffer memory reaches a certain maximum size, or when certain terminals exceed their prescribed input traffic rate.

A further implementation of statistical multiplexing data block structure which reduces the address overhead at heavy traffic load will also be described. Such data block structure includes an address information table which consists of sub-block indicator bits and sub-block size count bits for each terminal. The data field of a frame of data block consists of the address information table, and sub-blocks (without address label) collected from a complete scan of all the asynchronous input terminals. The sub-blocks are multiplexed in a fixed sequence order. If a terminal does not have any data to transmit during a scanning period, no sub-blocks are assigned for that terminal and the indicator bit for that terminal is set to zero. Such data structure is more restrictive (for example, priority scanning cannot be permitted), and more complex in data handling, than the data structure which consists of address labels. However, it does provide a reudction of about fifty percent in address overhead for heavy traffic loads.

Another important feature of the statistical multiplexing system of the present invention is that it not only can process messages to and from a plurality of asynchronous terminals but it is also capable of processing messages to and from a plurality of high speed synchronous terminals. To accomplish this, a synchronous terminal interface circuit is required to handle synchronous input data. In the same manner as the asynchronous terminals, the scanner periodically transfers data sub-block from the first buffer memory of the synchronous terminal interface circuit to the second buffer memory by way of the DMA circuit. The traffic arrival pattern of the synchronous terminals is different from that of the asynchronous terminals. The traffic arrives from the synchronous terminals usually as a continuous stream of data characters rather than as a random single character. As a result, the data sub-blocks collected in the first buffer memory of the synchronous terminal circuit interface are much larger than the sub-blocks from the asynchronous terminal interface circuits. Therefore, the sub-blocks from the synchronous terminals can be viewed as multiplexed data blocks from the plural asynchronous terminals. The multiplexer microprocessor schedules and multiplexes the sub-blocks from the synchronous terminals and the data blocks from the asynchronous terminals over the common communication channel to the remote location.

BRIEF DESCRIPTION OF THE DRAWINGS

FIG. 1 is a block diagram of an asynchronous time division statistical multiplexing system incorporating the concepts of the invention in accordance with a first embodiment of the invention;

FIG. 2 is a block diagram of the various components which make up a multiplexer/demultiplexer sub-system which is incorporated into the system of FIG. 1;

FIG. 3 is a representation of the data block format for the statistical multiplexing system of the invention;

Figure 4A:
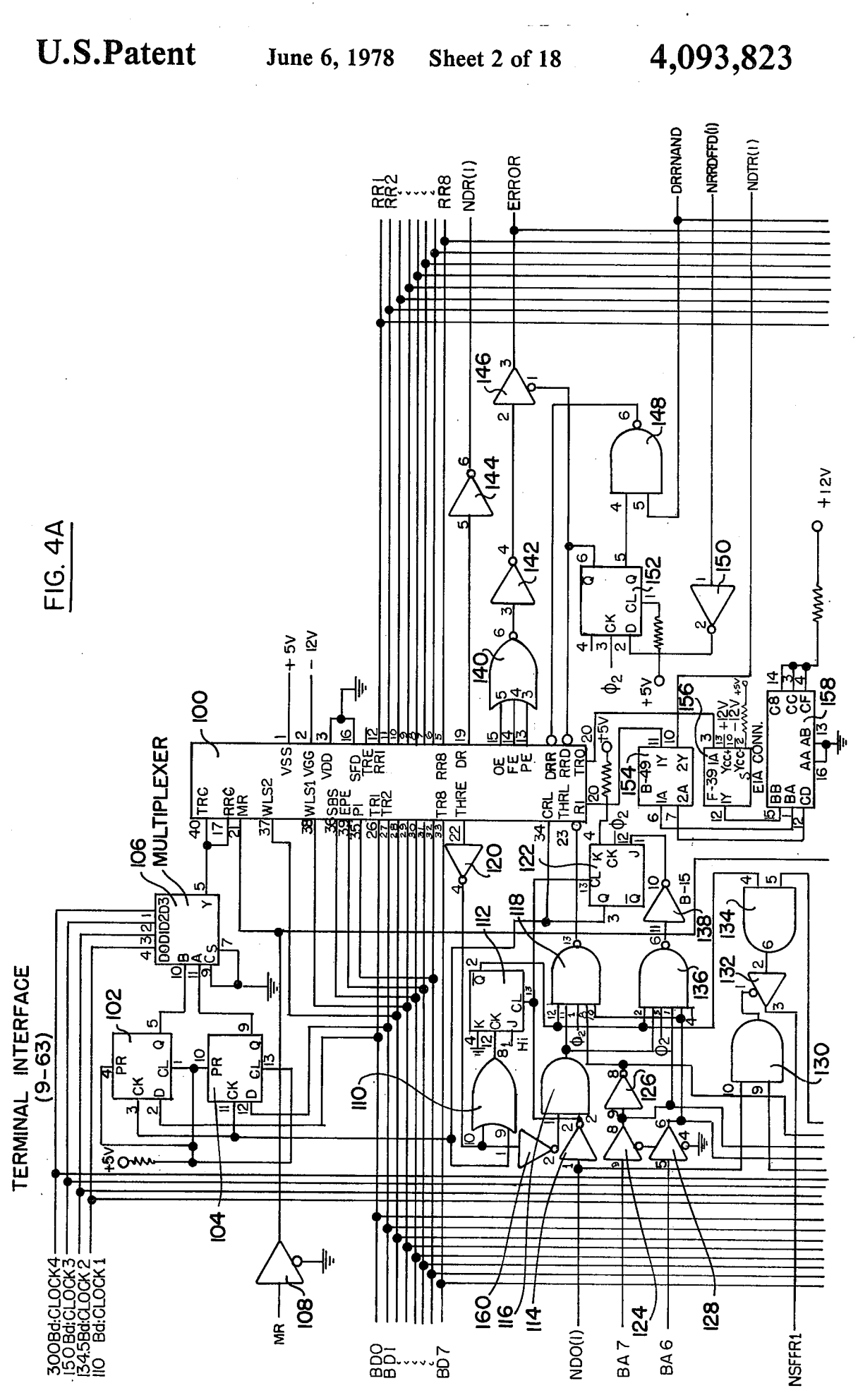

FIGS. 4A and 4B represent a logic diagram of a first type of terminal interface which is included in the multiplexer/demultiplexer of FIG. 2;

FIGS. 5A and 5B represent a logic diagram of a second type of terminal interface which is also included in the multiplexer/demultiplexer sub-system of FIG. 2;

FIGS. 7A and 7B represent a logic diagram of a first-in-first-out memory included in the multiplexer/demultiplexer sub-system of FIG. 2;

FIG. 8 is a representation of the characters taken into the first-in-first-out memory of FIG. 7;

FIGS. 11A and 11B represent a logic block diagram of a synchronous communication line interface constituting a synchronous transmitter and a synchronous receiver which are included in the sub-system of FIG. 2, and which serve to couple the sub-system to the common communication line of the system;

FIG. 12 is a logic diagram of a block/acknowledgment time-out circuit which also is included in the sub-system of FIG. 2;

FIG. 13 is a logic diagram of a random access read/write memory;

FIG. 17 is a further alternative representation of the data block format;

FIG. 18 is a representation of the data stream from the synchronous and asynchronous terminals in the system of FIG. 15.

DETAILED DESCRIPTION OF THE ILLUSTRATED EMBODIMENT

Figure 4B:
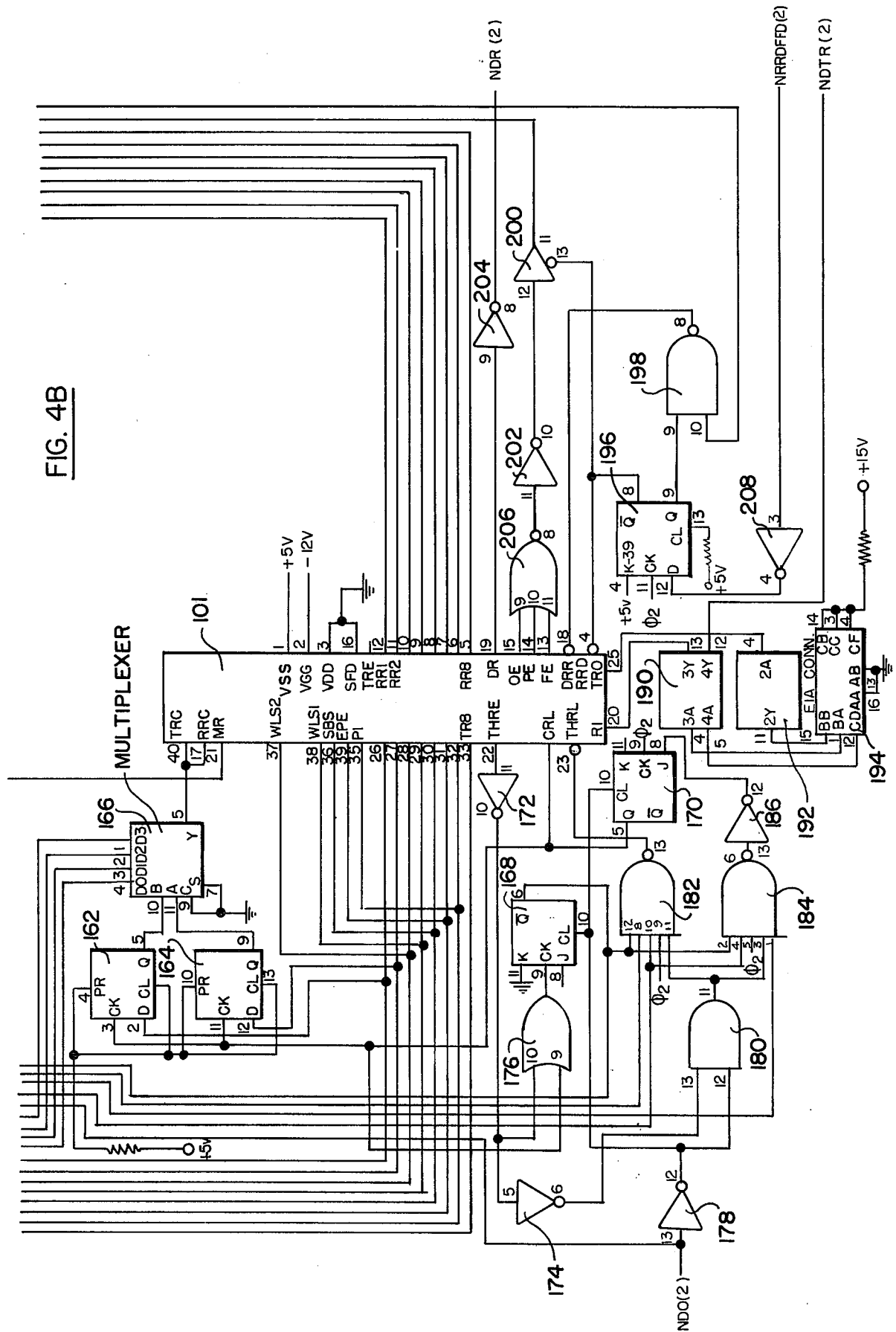

The statistical multiplexing system of the present invention, as shown in FIG. 1, consists of a plurality of individual terminals 1-n which are coupled to a multiplexer 10 and to a demultiplexer 12. The multiplexer 10 and demultiplexer 12 form multiplexer/demultiplexer pair No. 1 at the terminal end of the line. The multiplexer 10 is coupled to a demultiplexer 16 at a central processor over a common communication line on which the messages from the individual terminals are transmitted to the central processor in an asynchronous time division statistical multiplexed format.

The demultiplexer 16 is coupled to a plurality of central processor ports 1-n at the central processor, and these ports are also coupled to a multiplexer 18. The multiplexer 18 is coupled over the common communication line back to the demultiplexer 12. Messages from the central processor to the various terminals are transmitted as asynchronous time division statistical multiplexed signals over the latter line. The demultiplexer 16 and multiplexer 18 form a second multiplexer/demultiplexer pair, designated multiplexer/demultiplexer pair No. 2, at the central processor end of the line.

The inputs to the multiplexer 10 consists of low speed and high speed asynchronous inputs, and synchronous inputs. The interfaces between the asynchronous inputs and the multiplexer are standard interfaces, as will be described, which are protected by parity bits. The multiplexer provides automatic speed identification by an automatic procedure by typing an "L" or "CR" so that different terminals can be connected to a given central processor port without hardware/firmware modifications. The communications link output from the multiplexer is synchronous with high level data link control format and can be either full or half-duplexed operations. A 16-bit CRC (Cyclic Redundancy Check Code) is provided to protect error on a block of data. Error detection retransmissions are used for error control. The multiplexer may consist of multiple outputs to different destinations.

The details of the multiplexer/demultiplexer No. 1 at the terminal end of the communication line are shown in FIG. 2. The multiplexer/demultiplexer No. 2 at the central processor end of the line is almost identical to multiplexer/demultiplexer No. 1. It is therefore believed sufficient to describe the composition of the multiplexer/demultiplexer No. 1 in detail, and to refer to the multiplexer/demultiplexer No. 2 with respect to differences only.

For efficient buffer management, a microprocessor 34 is used in each multiplexer/demultiplexer pair for handling the traffic up to, for example, 63 terminals. The microprocessor serves as a special purpose computer. The program for the computer is stored in a read-only memory 38. A random access read/write (R/W) memory 36 associated with the microprocessor serves as the actual data buffer, as explained briefly above. The hardware which connects the terminals to the microprocessor, as well as the interface between the communication line and the microprocessor, which will be described in detail, are considered as the input/output devices of the microprocessor.

As shown in FIG. 2, the multiplexer/demultiplexer No. 1 includes a plurality of terminal interface circuits Nos. 1–63 which intercouple a corresponding number of the terminals to a scanner/priority encoder 30. The scanner/priority encoder 30 is coupled to a first-in-first-out (FIFO) memory 32 which, as stated above, in conjunction with the random access R/W memory 36 constitutes a two-stage buffer.

The multiplexer/demultiplexer No. 1 of FIG. 2 also includes a block/acknowledgement time-out circuit 44, direct memory access circuit 40, a status register I, a status register II, a synchronous transmitter 42 and synchronous receiver 38, the two latter components constituting the synchronous interface between the sub-system and the common communication line 46.

A message arriving from a given terminal to the multiplexer/demultiplexer No. 1 of FIG. 2 at the terminal end of the common communication line 46, first passes through the corresponding one of the terminal interface circuits 1–63. These circuits serve to convert the serial data stream which constitutes the message into a byte-parallel format. The terminal interface circuit also performs parity error checking. When a particular terminal interface circuit has a data byte ready in its buffer register, it issues a "data ready" signal. The "data ready" lines of all the terminal interface modules 1–63 are checked by the scanner/priority encoder 30.

The terminals 1–8 are considered to be high speed terminals, and the terminals 9–63 are considered to be low speed terminals. If any one of the high speed terminals 1–8 has data ready, it is selected by the scanner/priority encoder 30. Terminals 9–63 are then checked for data by the encoder in a cyclic high speed scanner, with all the low speed terminals being checked once every 27.5 microseconds, for example, and with all the low speed terminals being assigned equal priority. After the scanner/priority encoder 30 has selected a terminal for delivery of a data byte, the data byte together with the corresponding terminal identification number is shifted into the FIFO memory 32. The scanner/priority encoder 30 then resumes its checking function.

When the FIFO memory 32 has a character composed of a data byte and a terminal identification byte, ready at its output, it sets a flag bit in status register I, thus requesting the attention of the microprocessor 34. The microprocessor answers by taking the character out of the FIFO memory and storing it in the random access R/W memory 36. The processor stores all the characters from the same terminal into a dedicated block in memory 36 and forms a sub-block for that particular terminal, as shown in FIG. 3. When the sub-blocks reach their maximum size of, for example, four characters, the microprocessor 34 then chains these blocks and forms data block. When the data block reaches its prescribed maximum length in the R/W memory 36, the microprocessor is ordered to transfer the data block through the direct memory access circuit 40 to the synchronous transmitter 42 for transmission over the common line 46.

The data block shown in FIG. 3 includes an 8-bit frame byte at each end with the identifying designation 01111110. The block also includes a 2-bit data block destination address byte A, a 6-bit block sequence number byte S#, an 8-bit count byte which indicates the length of the date byte, a data portion which has a variable range up to, for example, 256 bytes, and a 16-bit CRC (Cyclic Redundancy Check Code) byte. The sub-blocks formed by the processor are fitted into the data portion of the transmitted block of FIG. 3.

Each sub-block in FIG. 3 includes a 6-bit byte portion $a_i$ which designates the address of the corresponding terminal from which the block was derived; a 2-bit byte $n_i$ which indicates the size of the data byte in the sub-block, and a 32-bit byte $d_i$ which represents the data from the terminal. The data block also includes a sub-block which has a 6-bit byte $a_{64}$ which serves as an acknowledgment byte, and a 2-bit byte $d_{64}$ which serves as an acknowledgment block sequence number.

Therefore, the data block format of FIG. 3 consists of a control field, a data field and an error control field. The control field consists of a 2-bit destination address section, a 6-bit data block sequence section, and an 8-bit block length section. Block sequence No. 0 is designated as an acknowledgment block. The data field, as described, consists of labelled data sub-blocks. The maximum block size in the illustrated embodiment is 256 bytes. A unique label is assigned to the acknowledgment block sequence number ($a_{64}$). The error control consists of a 16-bit cyclic redundancy check (CRC)

code. The advantage of such data block transmission is that error control can be applied to the entire block rather than to each character alone.

Figure 16:
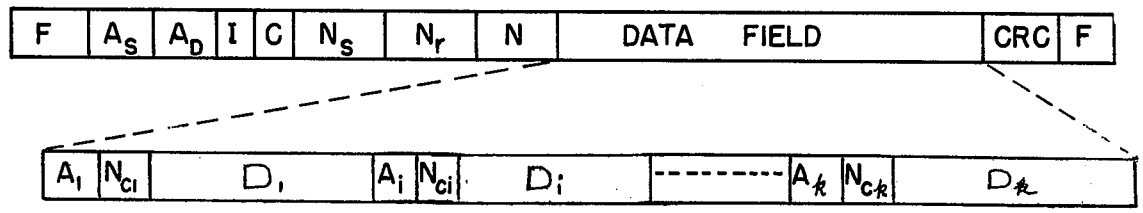
FIG. 16 is an alternative representation of the data block format for the statistical multiplexing system of the invention.

A preferred form of the data block is shown in FIG. 16. The data block shown in FIG. 16 includes an 8-bit frame byte (F) at each end with an identifying designation 01111110. The block also includes a 3-bit sender address byte $A_s$ and 3-bit block destination address byte $A_d$; a block identifier bit I (I=O data block; I=1 control block); a bit C (C=O positive acknowledgment; C=1 negative acknowledgment); a 4-bit sending block sequence number; a 4-bit receive block sequence number; an 8-bit count byte (N) which indicates the length of the data field; a data field which has a variable range up to, for example 256 bytes; and a 16-bit CRC (Cyclic Redundancy Check) byte. The sub-blocks formed by the microprocessor are fitted into the data field of the transmitted block as shown in FIG. 16. The addressed data sub-block structure can be a variable size but up to a maximum fixed length. Each sub-block includes a 6-bit byte portion A which designates the address of the terminal from which the block was received; a 2-bit byte $N_c$ which indicates the number of data characters in the sub-block, and a plurality of 7 or 8 bit data characters.

To reduce address overhead, an alternative implementation of statistical multiplexing data structure is to let each frame of data block consist of the data collected from a complete scan of all the asynchronous input terminals. The data collected are arranged according to the scanning order. An address information table is assigned at the beginning of the data field. In the address information table, there is an indicator bit I', and 2 to 3 bit-byte count of sub-block size for each terminal (FIG. 17). With such an addressing scheme, only 3 to 4 bits are required to describe each data sub-block (instead of 8 bits as compared with the data structure in FIG. 16) which represents a fifty to sixty percent reduction in address overhead. However, since the address information table overhead is fixed; that is, the indicator bits and the sub-block size count are required regardless whether the user has a message to transmit or not, such data structure has advantage only when all the terminals are active and have heavy traffic loads. Further, the data handling is more complex with the data structure of FIG. 17, than with the data structure of FIG. 16.

In order to reduce the message delay at a low input traffic rate, the block time-out section of block/acknowledge time-out circuit 44 issues an interrupt request a specific time after a first message character from a terminal enters into the R/W memory 36. The microprocessor 34 then collects all the sub-blocks in the R/W memory 36 and forms them into a data block. The data block is then transferred to the synchronous transmitter 42 through the direct memory access circuit 40 for transmission over the communication line 46.

The synchronous transmitter 42 serves as an interface between the microprocessor data bus and the communication line 46. Due to the synchronous nature of the line, the transmitter continuously sends a frame character (01111110) over the communication line when no data is being transmitted. Upon receiving a block of data from the R/W memory 36, under the control of microprocessor 34, the transmitter serially sends the data blocks over the communication line and adds the 16-bit cyclic redundancy check (CRC) error code to each block. After the transmission of a complete block, transmitter 42 resumes its sending of the frame characters, until it receives the next data block from the R/W memory 36 by way of the direct memory access register 40.

The multiplexer/demultiplexer No. 1 of FIG. 2 also includes synchronous receiver 48 which accepts an incoming serial data stream from the central processor, and which delivers the received data blocks on a byte-by-byte basis, by way of the direct memory access register 40, to the R/W memory 36. After the data portion of a received block has passed through the receiver 48, the receiver checks the following CRC bits for errors. Should an error occur, an error flag is set in status register II, and the microprocessor 34 is notified. This causes the corresponding received block to be rejected, and no acknowledgment is transmitted back over the communication line 46, so that the sender is aware that he must retransmit the block.

A special acknowledgment procedure employing the block/acknowledgment time-out circuit 44 is provided. Upon the correct receipt of a complete block from the central processor, the microprocessor 34 in the multiplexer/demultiplexer No. 1 of FIG. 2, causes an acknowledgment message to be sent over communication line 46 to the microprocessor 34 in the multiplexer/demultiplexer No. 2 at the central processor end of the communication line, causing the latter to release the buffer space of that block from its R/W memory 36. The acknowledgment message may be transmitted separate from a regular data message, and may be distinguished from a data block by a special address. Alternately, the acknowledgment message may be formed as an acknowledgment sub-block within a data message which is designated with a unique address (e.g. 64). If the multiplexer/demultiplexer No. 2 at the transmitting end of the communication line does not receive an acknowledgment message within a specified time after the transmission of a data blocks, the acknowledgment section of block/acknowledge time-out circuit 44 generates an interrupt request. The unacknowledged data block is then considered to be in error, and it is re-transmitted automatically.

After a received data block is assembled correctly in the random access R/W memory 36 by microprocessor 34, the microprocessor causes the block to be delivered to an output buffer and demultiplexer 49. The output buffer and demultiplexer interprets the terminal number of the received block, and distributes the data bytes to the designated one of terminal interfaces 1-63. The selected terminal interface performs a parallel/serial conversion, adds frame and parity bits to the data, and delivers the data to the selected terminal at the correct baud rate.

The components of the multiplexer/demultiplexer No. 1 of FIG. 2 are all interconnected by a bus system 50 which includes a data bus, a control bus, and an address bus. When microprocessor 34 transmits a particular address over the address bus, a component which recognizes that address connects itself to the data bus. The data bus, the control bus and the address bus all use tri-state logic. The buses are eight bits wide, except for the address bus which is 16 bits wide, thus facilitating memory addressing up to 64k bytes.

Except for interrupts, such as block time-out or acknowledgment time-out, controlled by the block/acknowledge time-out circuit 44, the two status registers I and II inform the microprocessor 34 of the status of all the input/output components of the multiplexer/demultiplexer No. 1. Status register I considers the status of the asynchronous part of the mutliplexer/demultiplexer, such as FIFO ready, output buffer ready, and terminal-down. Status register II represents the status of the synchronous line interface, such as receiver data available, receiver overrun, transmitter buffer empty, transmitter end of block, receiver end of block, receiver error, abort received block.

The front panel of the multiplexer/demultiplexer unit may be designed to display the complete system status. For example, binary light emitting diode displays may be used to show the condition of the data bus, the address bus, and all status flags; and switches may be provided for external control of the system, such as system reset, microprocessor reset, hold, wait, single step.

The following software functions are programmed into the read-only memory 38 of microprocessor 34:

1. Accept data and terminal number bytes from FIFO memory 32 via input instructions, and store them in R/W memory 36.

2. Perform automatic terminal identification for terminals 9–63. (Derive terminal number from the bit pattern of the address character, and set terminal interface format accordingly.)

3. Echo characters back to the sending terminal.

4. When a block of data is assembled in R/W memory 36, assign a block sequence number to it, and transfer it to the synchronous transmitter 42 by way of direct memory address (DMA) circuit 40, loading the starting address of the R/W memory for retrieving the data block in the DMA circuit, set the block identifier to one if it is a control message, and zero if it is a data block.

5. Transfer partially filled blocks to the synchronous transmitter when a block time-out interrupt is generated by block/acknowledge time-out circuit 44.

6. Signal a "terminal-down" condition to the correct central processor port.

7. Loading the starting address of the R/W memory for storing the received data block in the DMA circuit. Receive blocks from the synchronous receiver 48 by way of the direct memory access register 40 and store them in R/W memory 36.

8. Initiate direct memory access operation for transfer of data into R/W memory 36 from synchronous receiver 48, and out of R/W memory 36 to synchronous transmitter 42.

9. Send acknowledgments for correctly received data blocks. Negative acknowledgment for the incorrectly received data blocks.

10. Retransmit a data block when receipt of a negative acknowledgment or when an acknowledgment time-out interrupt is generated by the block/acknowledge time-out circuit 44.

11. Release buffer space of the acknowledged blocks from R/W memory 36.

12. Translate terminal numbers to designated central processor port addresses (which are not necessarily the same).

13. Send terminal characters, or sub-blocks of characters to the selected terminal interface.

Each terminal interface circuit 1–63 has a receiving section which accepts a serial asynchronous data stream from its corresponding terminal (or central processor port), and each terminal interface delivers the data to the multiplexer system in byte parallel form. Each terminal interface circuit also has a transmitter section which accepts data byte-by-byte, and serially transmits the received data to the corresponding terminal (or central processor port). These functions are performed in the individual terminal interfaces in full-duplex mode. The only difference between the interfaces used in multiplexer/demultiplexer No. 1 and multiplexer/demultiplexer No. 2, is that in multiplexer/demultiplexer No. 1, a "data terminal ready" signal is generated which indicates whether the corresponding terminal is active or not.

There are two different types of terminal interface circuits in the system being described. The terminal interface circuits 9–63 are of the type shown in the logic diagram of FIGS. 4A, 4B and are provided for the low speed terminals 9–63 whose speeds run from 110–300 Bd, and whose clock rate and format are selected by the automatic terminal identification routine of microprocessor 34. The terminal interface circuits 1–8 are designed for the high speed "dedicated" terminals 1–8 which operate at higher baud rates (300–9600 Bd) than the low speed terminals, and whose clock and format can be programmed by switches, the latter type of interfaces being shown by the logic diagram of FIGS. 5A, 5B.

Each terminal interface circuit in FIGS. 4A, 4B and 5A, 5B includes two universal asynchronous receivers/transmitters and their interface logic. Clock rate and format at which the corresponding terminals operate are selected by microprocessor 34 by way of terminal identification software routine.

The universal asynchronous receiver/transmitters are designated 100, 101 in FIGS. 4A, 4B and 5A, 5B, and these elements may be formed of integrated circuits of the type designated 1402. In FIG. 4, the universal asynchronous receiver/transmitter 100 has a pair of D flip-flops 102, 104, a multiplexer 106, an amplifier 108, an "or" gate 110, a JK flip-flop 112, an inverting amplifier 114, an "and" gate 116, a "nand" gate 118, an inverting amplifier 120, a JK flip-flop 122, an amplifier 124, an inverting amplifier 126, an amplifier 128, an "and" gate 130, an amplifier 132, an "and" gate 134, a "nand" gate 136, an inverting amplifier 138, a "nor" gate 140, an inverting amplifier 142, an inverting amplifier 144, an amplifier 146, a "nand" gate 148, an inverting amplifier 150, a D flip-flop 152, a line receiver 154, a line driver 156, an EIA connector 158, and an inverting amplifier 160 associated therewith.

The D flip-flops 102 and 104 may each be one-half an integrated circuit 7474. Multiplexer 106 may be an integrated circuit 74151. Amplifier 108 may be one-quarter an intergrated circuit 8093. "And" gate 110 may be an integrated circuit 7432. JK flip-flops 112 and 122 may each be one-half an integrated circuit 74107. Inverting amplifier 114 may be an integrated circuit 7404. "And" gate 116 may be an integrated circuit 7408, "nand" gate 118 may be an integrated circuit 8092, inverting amplifier 120 may be an integrated circuit 7404, amplifier 124 may be an integrated circuit 8093, inverting amplifier 126 may be an integrated circuit 7404, amplifier 128 may be an integrated circuit 8093, "and" gate 130 may be an integrated circuit 7403, amplifier 132 may be an integrated circuit 8093, "and" gate 134 may be an integrated circuit 7418, "nand" gate 136 may be an integrated circuit 8092, inverting amplifier 138 may be an integrated circuit 7404, "nor" gate 140 may be one-third an integrated circuit 7427, inverting amplifier 142 may be an integrated circuit 7404, as may inverting amplifier 144, amplifier 146 may be one-quarter an integrated circuit 8093, "nand" gate 148 may be an integrated circuit 7400, inverting amplifier 150 may be an integrated circuit 7404, D flip-flop 152 may be one-half an integrated circuit 7474, line receiver 154 may be one-half an integrated circuit 75154, line driver 156 may be one-half an integrated circuit 75150, inverting amplifier 160 may be an integrated circuit 7404.

The universal asynchronous receiver/transmitter 101 has the following logic components associated with it: a pair of D flip-flops 162, 164, a multiplexer 166, a pair of JK flip-flops 168, 170, a pair of inverting amplifiers 172, 174, an "or" gate 176, an inverting amplifier 178, an "and" gate 180, a pair of "nand" gates 182, 184, an inverting amplifier 186, an "and" gate 188, a line receiver 190, a line driver 192, an EIA connector 194, a D flip-flop 196, a "nand" gate 198, an amplifier 200, and a pair of inverting amplifiers 202, 204, a "nand" gate 206, and an inverting amplifier 208.

The D flip-flops 162 and 164 may each be one-half an integrated circuit 7474, multiplexer 166 may be an integrated circuit 74151, JK flip-flops 168 and 170 may each be one-half an integrated circuit 74107, inverting amplifier 172 may be an integrated circuit 7404, as may be inverting amplifier 174 and inverting amplifier 178, "or" gate 176 may be an integrated circuit 7432, "and" gate 180 may be an integrated circuit 7408, "nand" gate 182 may be an integrated circuit 8092, as may "nand" gate 184, inverting amplifier 186 may be an integrated circuit 7404, "and" gate 188 may be an integrated circuit 74408, line receiver 190 may be one-half an integrated circuit 75154, line driver 192 may be one-half an integrated circuit 75150, D flip-flop 196 may be one-half an integrated circuit 7474, "nand" gate 198 may be an integrated circuit 7400, amplifier 200 may be one-quarter an integrated circuit 8093, inverting amplifier 202 may be an integrated circuit 7404, as may inverting amplifier 204, "nor" gate 206 may be one-third an integrated circuit 7427, and inverting amplifier 208 may be an integrated circuit 7404.

When the system is first turned on, a master reset (MR) signal resets the universal asynchronous receivers/transmitters (UART) 100, 101. Next, an initial standard format and baud rate is selected for the UART. The master reset (MR) signal is also applied to the UART control register load input (CRL), and to the two word length select inputs (WLS1, WLS2) by way of two "or" gates so that an initial word length of 8-bits is selected. At the same time, the inverted MR signal (NMR) presets the two D flip-flops 102, 104 whose positive outputs are fed into the inputs of multiplexer 106. The multiplexer selects one of four possible clocks for terminals operating at 100, 134.5, 150 and 300 Bd, in the terminal interface circuit of FIGS. 4A, 4B, and feeds the selected clock into the UART clock inputs (RRC, TRC). The clock rate is 16 times the desired baud rate. At MR time, an initial speed of 300 Bd is selected.

When one of the terminals 9-63 introduces a message to multiplexer/demultiplexer No. 1, the microprocessor 34 of FIG. 2 determines its baud rate from the LOGON bit pattern of the input character. The LOGON bit pattern is produced by a repeatedly typed "L" or carriage return symbol "CR". After recognizing the LOGON bit pattern, the microprocessor transfer baud rate and format information of that terminal to the output buffer register, and to the buffered data lines BD0-BD7 of bus 50.

The correct terminal interface circuit is selected by setting its "data out" (NDO) line low and setting address line 7 (DA7) high. When the UART terminal holding register is empty (THRE is high), the system clock $\phi_2$ (2 MHz) strobes the UART CRL line, and the format is taken from Bd2, Bd3, Bd4, Bd5, and Bd6 into the UART control register. At the same time, the two clock select flip-flops 152 and 196 are set to the values specified by Bd0 and Bd1, so that the clock multiplexer 106 selects the correct baud rate for the terminal. When THRE goes low, the "NSFFR1" pulse resets the output buffer, indicating that the clock/format information has been correctly received. The clock/format of the corresponding asynchronous interface at the central processor's location is set up in the same way by a microprocessor output instruction of multiplexer/demultiplexer No. 2 in FIG. 1.

The transmitter section of the interface of FIGS. 4A, 4B which is formed by UART 101, operates as follows. When a data byte is to be sent from the output buffer register to the UART 101, a particular interface is selected by settings its "data out" (NDO) (2) line low. A low on address bit 7 (BA7) indicates that a data byte is to be transmitted. When THRE is high, $\phi_2$ strobes the transmitter holding register load (THRL) line, which causes the data byte to be taken into the UART 101. At the same time, the K flip-flop 170 is set which prevents repeated strobing of THRL. When THRE goes low, this flip-flop is cleared, and a "NSFFR1" pulse resets the output buffer register. When THRE goes high again, the UART 101 is ready to accept the next data byte.

When the UART 100 has assembled a character in its receiver holding register, the data ready (DR) line goes high. When the multiplexer/demultiplexer No. 1 is ready to accept a character, a low signal is sent over the NRRDFFD line which, after being inverted, is connected to the data input of D flip-flop 152. The next $\phi_2$ pulse triggers this flip-flop, and its $\overline{Q}$ outputs sets the UART RRD line low, which connects the internal UART receiver holding register to the data outputs RR1-RR8. The tri-state RR outputs of all the UART's are tied together, and lead to the FIFO memory 32.

The serial interface logic consists of one EIA socket or connector 158 per port, one standard line driver 156, and one standard line receiver 154 which are connected to the serial input and output (R1 and TRO) of the UART 100. When the UART 100 detects an error in the received data, one of the outputs OE, FE, PE goes high. These outputs are "or'd" together by "or" gate 140, and TRI buffered. The error lines of all interfaces are tied together, and lead to the FIFO memory 32.

After the FIFO memory 32 has accepted a character, it transmits a reset (DRRNAND) pulse to all interface boards, and this pulse is applied to the data ready reset (DRR) line of the UART 100 that delivers the character. This pulse resets the data ready line (DR) of the asynchronous receiver 48.

Figure 5A:
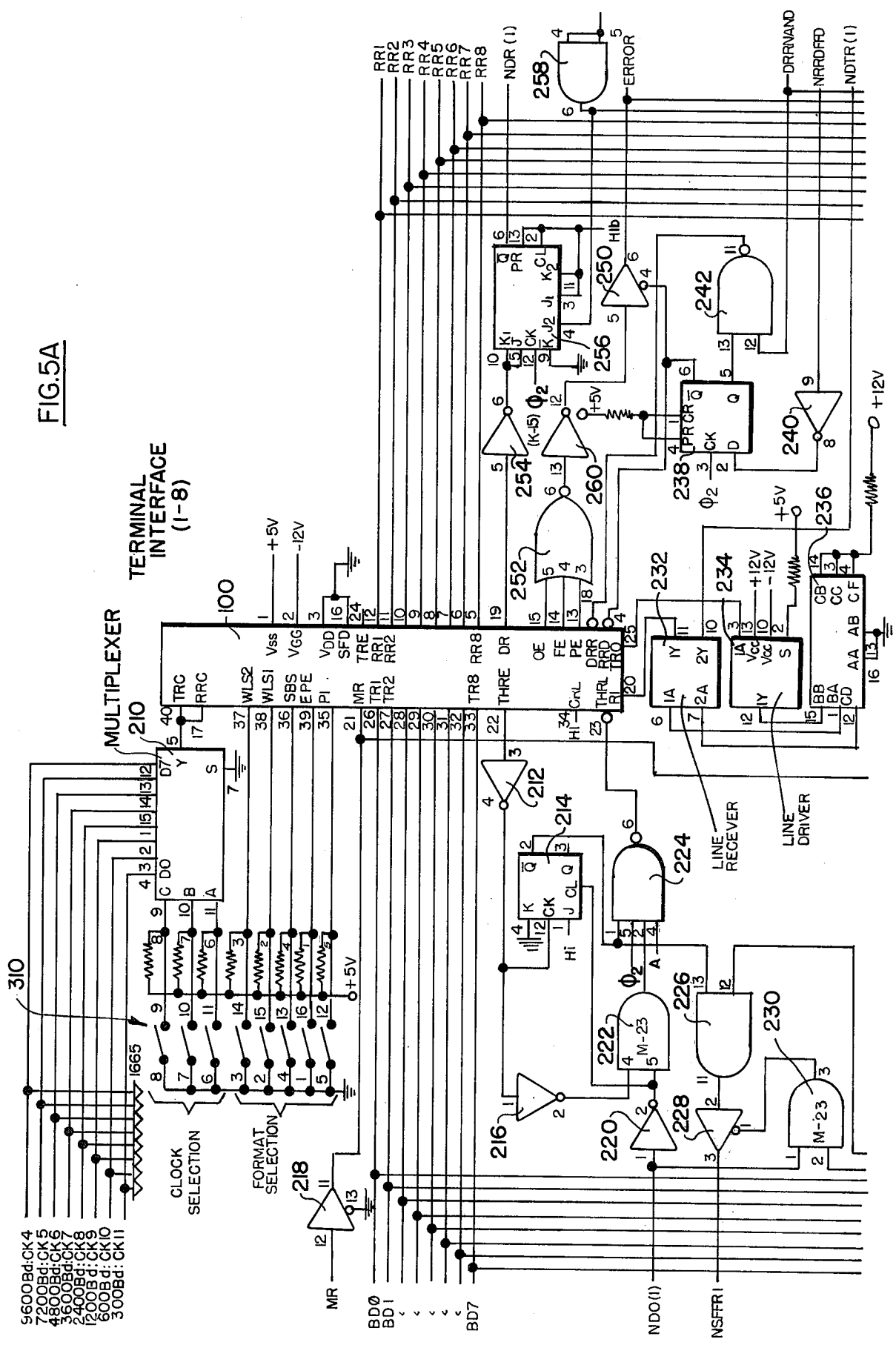

The circuit of the terminal interface of FIGS. 5A, 5B is generally similar to that of FIGS. 4A, 4B, and it also includes a pair of UART's 100, 101. The UART 100 has the following logic components associated with it: multiplexer 210 (7451), inverting amplifier 212 (7404), JK flip-flop 214 (74107), inverting amplifier 216 (7404), amplifier 218 (one-quarter 8093), inverting amplifier 220 (7404), "and" gate 222 (7408), "nand" gate 224 (one-half 7420), "and" gate 226 (7408), amplifier 228 (one-half 8093), "and" gate 230 (7408), line receiver 232 (2/475154), line driver 234 (one-half 75150), EIA connector 236, D flip-flop 238 (one-half 7974), inverting amplifier 240 (7404), "nand" gate 242 (7400), amplifier 250 (8093), "nor" gate 252 (one-third 7427), inverting amplifier 254 (7404), JK flip-flop 256 (7470), "and" gate 258 (74H08), and inverting amplifier 260 (7404).

The UART 101 in FIG. 5B has associated with it a multiplexer 264 (74151), an inverting amplifier 266 (7404), a JK flip-flop 268 (one-half 74107), an inverting amplifier 270 (7404), an inverting amplifier 272 (7404), an "and" gate 274 (7408), a "nand" gate 276 (one-half 7420), an inverting amplifier 278 (7404), an "and" gate 280 (74H08), an "and" gate 282 (74H08), a line receiver 284 (2/475154), a line driver 286 (75150, an EIA connector 288, a "nor" gate 290 (one-third 7427), an inverting amplifier 292 (7404), an inverting amplifier 294 (7404), a JK flip-flop 296 (7470), an amplifier 298 (8093), a D flip-flop 300 (one-half 7474), a "nand" gate 302 (7400), an inverting amplifier 304 (7404).

The UART 100 in FIG. 5A also includes a plurality of clock selection and format selection switches designated generally as 310, and UART 101 in FIG. 5B has a plurality of clock selection and format selection switches designated generally as 312.

As described above, the function of the scanner/priority encoder 30 in FIG. 2 is to select one of the universal asynchronous receivers/transmitters in a corresponding terminal interface which has a data byte ready in its receiver holding register, and to deliver the corresponding input/output terminal port member to the FIFO module 32. The main component of the scanner/priority encoder are a priority encoder for the terminal interfaces 1-8 of FIGS. 5A, 5B and a cyclic scanner for the terminal interfaces 9-63 of FIGS. 4A, 4B. The details of the scanner and priority encoder are shown in FIG. 6.

Figure 6:
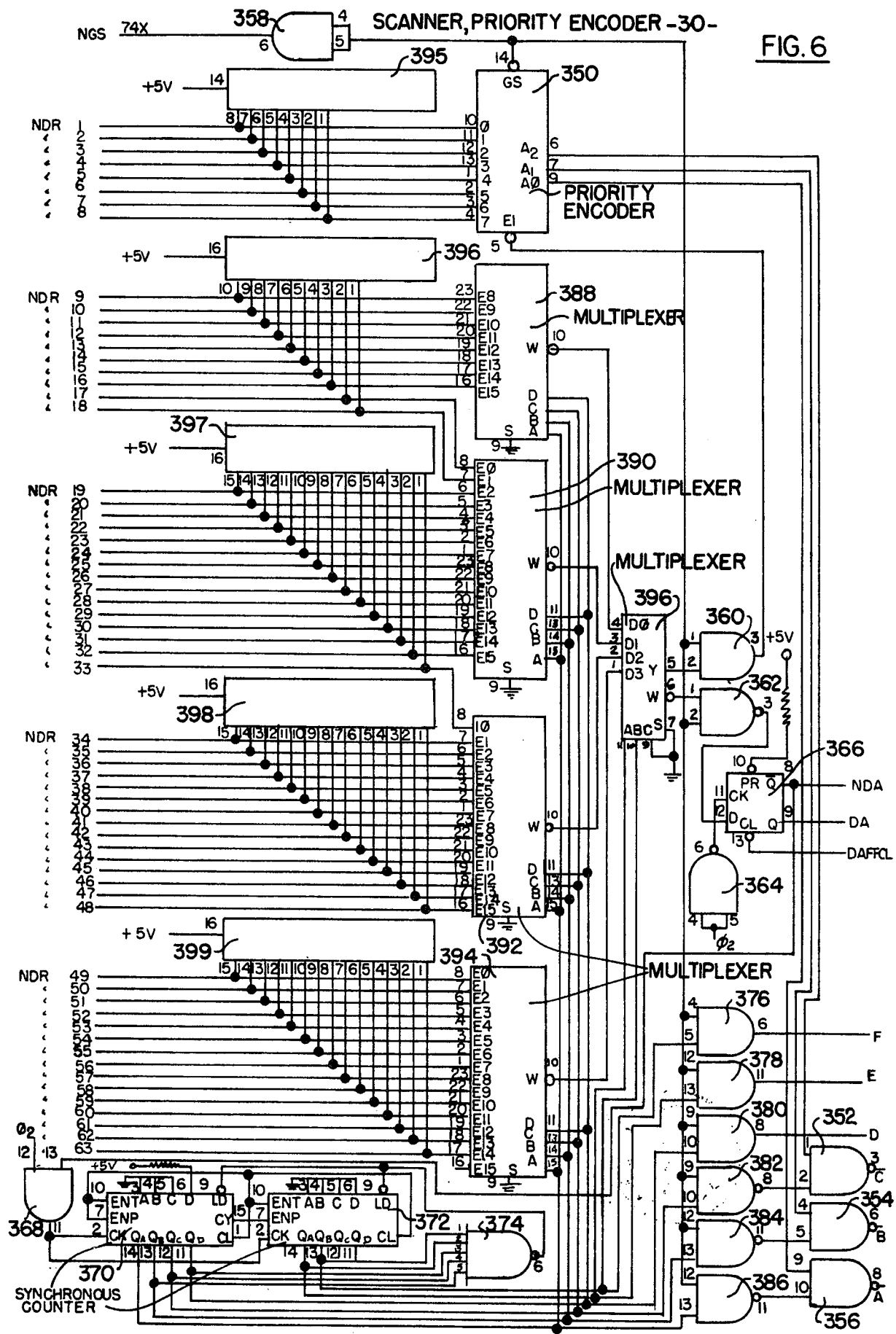
FIG. 6 is a logic diagram of a scanner/priority encoder which is included in the multiplexer/demultiplexer sub-system of FIG. 2.

The system of FIG. 6 includes an eight input priority encoder 350 (74148), whose outputs are fed to three "nand" gates 352, 354, 356 (7400). The priority encoder is also connected to an "and" gate 358 (74508), and to an "and" gate 360 (7408) and to a "nand" gate 362 (7400). A "nand" gate 364 (7400) is connected to a data available D flip-flop 366 (7474). The $\bar{Q}$ output of flip-flop 366 is connected to an "and" gate 368 (7408) which is connected to a pair of synchronous counters 370, 372 (74163). The counters are connected to a "nand" gate 374 (8093) and to three "and" gates 376, 378, 380 (7408). The counter is also connected to three "nand" gates 382, 384, 386 (7400). The system of FIG. 6 also includes a 55/6 multiplexer which is made up of four 16/4 multiplexers 388, 390, 392, 394 (74150) and a 4/1 multiplexer 396 (74151A).

The inverted and latched data ready signal (NDR) from the asynchronous receivers in terminal interface circuits 1-8 are fed into the eight inputs of priority encoder 350 over eight NDR lines. When any one of the NDR lines is active (low), the corresponding terminal number appears on the three encoder outputs A0, A1, A2 in binary form. If two or more HDR signals are active, the terminal having the lowest number is selected.

When the encoder generates an address, it also sets an NGS line low. The NGS line is used in the terminal interface circuits to prevent further activation of NDR lines, so that the terminal number will not change once a receiver is selected. In addition, the NGS line sets the data available flip-flop 366 which is checked by the inverted system clock $\phi_2$, and whose $\bar{Q}$ output stops the scanner section of the encoder. Finally, the NGS signal logically separates the six terminal/port address lines from the scanner, to insure that the three low order bits of the terminal number (A,B,C) are equal to the encoder outputs, and that the three high order bits (D,E,F) are low. The resulting 6-bit represents in binary coded form the terminal number (1-8).

The scanner portion of the scanner/priority encoder of FIG. 6 consists of the 6-bit counter 370, 372, and the multiplexer 388, 390, 392, 394, 396. When enabled, the synchronous counter 370, 372 cyclically counts from 9 to 63. Since the 2 MHz system clock is used as a clock for the counter, each of the fifty-five scanned terminal receivers is checked once very 27.5 microseconds. The six scanner outputs from the number of the checked terminal are fed into the data select input of the multiplexer 388, 390, 392, 394, 396.

The data inputs of the multiplexer are the fifty-five inverted data ready (NDR) lines of the asynchronous terminal interface circuits 9-63. When any one of these inputs is low, the scanner is stopped, and the data available flip-flop 366 is set. In addition, the priority encoder for terminals 1-8 is disabled, which causes its outputs to go high, so that they will not interfere with the scanner address output. All sixty-three NDR inputs to the scanner/priority encoder 30 are equipped with pull-up resistors represented by blocks 395, 396, 397, 398, 399, so that terminal interface circuits can be added or removed without any modification on the scanner board.

Figure 7A:
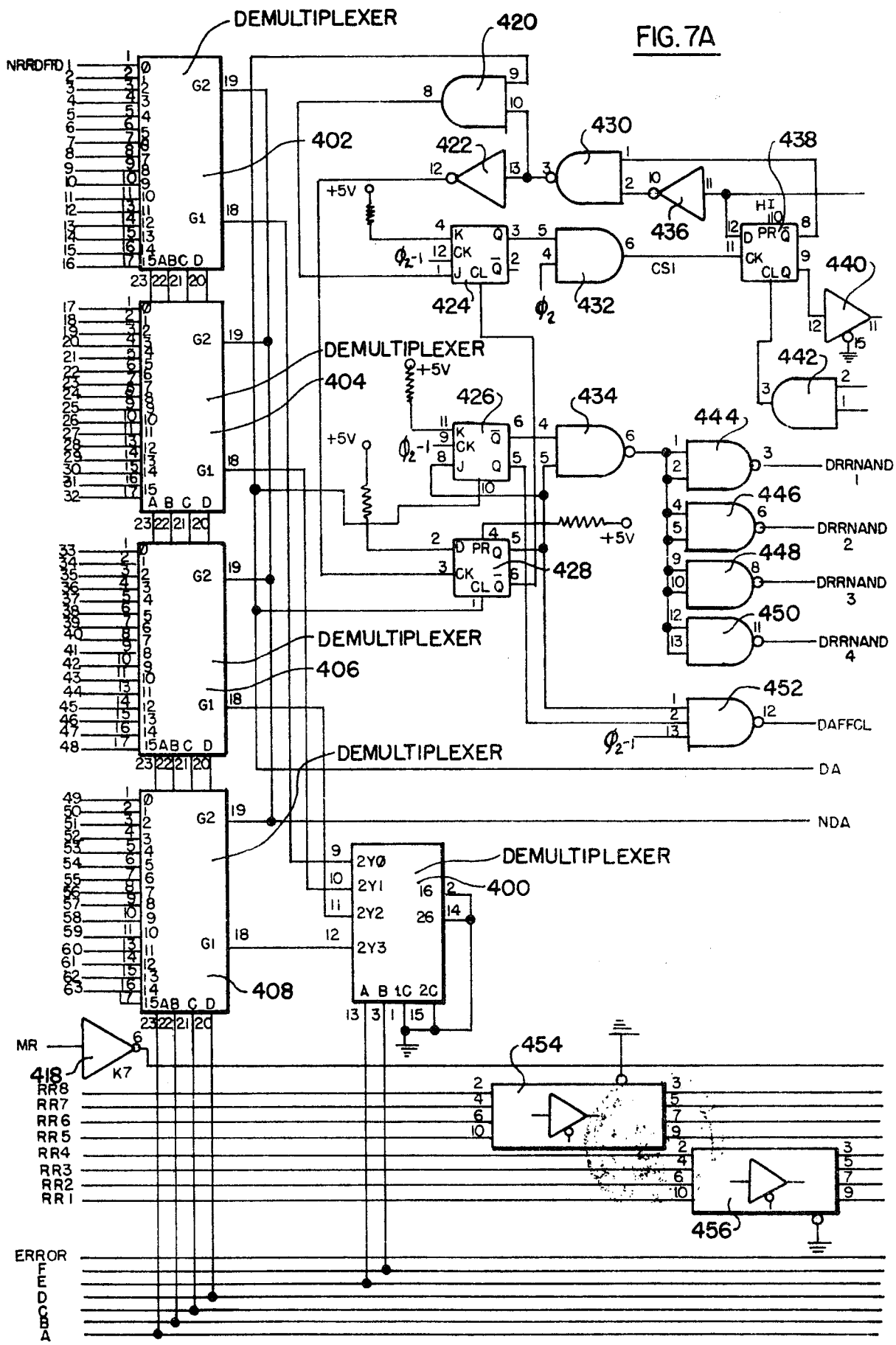

The first-in-first-out memory of FIG. 2 is shown in logic detail in FIG. 7. The FIFO memory serves as a first buffer for the data from the scanner/priority encoder 30. Under heavy load conditions, the buffering provides the microprocessor 34 of FIG. 2 with sufficient time to retrieve the data from the FIFO memory and store the data in the random access R/W memory 36. The FIFO memory circuit also contains a demultiplexer which enables the terminal interface circuit that was selected by encoder 30 for the delivery of a character.

When the scanner/priority encoder 30 selects a particular terminal interface circuit, its DA line enables the demultiplexer, which consists of one 2/4 demultiplexer 400 (74155), and four 4/16 demultiplexers 402, 404, 406 and 408 (74154). The 6-bit terminal number provided by the scanner/priority encoder is fed into the demultiplexer select inputs. As a result, one of the sixty-three NRRDFFD output lines will be activated low, and the selected terminal interface circuit will, in turn, place its data bit on the 8RR line.

The FIFO memory 32 also includes four (64 words by 4 bits) memories which are arranged such that a 64 words by 16 bits FIFO memory is obtained. These memories are designated by the blocks 410, 412, 414, 416 (3341). A two-byte character (FIG. 8) is taken into the FIFO memory at a time, consisting of an 8-bit data byte (RR1-RR8), a 6-bit address byte (A-F), and an error bit. After the input, these bytes are shifted through the FIFO memory 410, 412, 414 and 416, and taken out by the microprocessor 34 of FIG. 2 on a byte-by-byte basis via two input instructions.

The MR input to the circuit of FIG. 7 is applied to an inverting amplifier 418 (7404), whose output ($\overline{MR}$) is applied to the memories 410, 412, 414 and 146. The demultiplexers have the following logic elements associated with them: an "and" gate 420 (74H08), an inverting amplifier 422 (7404), a JK flip-flop 424 (one-half 74107), a JK flip-flop 26 (one-half 74107), an "and" gate 432 (74H08), a "nand" gate 434 (7400), an inverting amplifier 436 (7404, a D flip-flop 438 (one-half 7474), an amplifier 440 (8097), an "and" gate 422 (74H08), and a plurality of "nand" gates 444, 446, 448 and 450 (7437), and a "nand" gate 452 (7410).

The data inputs applied to the memories 410, 412, 414 and 416 are amplified by amplifiers 454, 456 (8097). The IR outputs of the memories are introduced to respective inverting amplifiers 458, 460, 462 and 464 (7404). The amplifiers are connected to a "nor" gate 466 (7425), and to a "nand" gate 468 (one-half 7420). The OR outputs of the memories 410, 412, 414, and 416 are introduced to respective inverting amplifiers 470, 472, 474 and 476 (7404). The $Q_0$, $Q_1$, $Q_2$, $Q_3$ outputs of the respective memories are introduced to amplifiers 478, 480, 482 and 484 (4 × 8094).

Also associated with the memories are "nor" gates 486 and 488 (7402), "nand" gates 490, 492 (7400), D flip-flops 494, 496 (one-half 7474), a pair of inverting amplifiers 498, 500 (7404), a "nand" gate 502 (7420), a D flip-flop 504 (one-half 7474), and a pair of "nor" gates 506, 508 (7402).

The system of FIG. 7 also includes a pair of amplifiers 510 and 512 (8097), an inverting amplifier 514 (7404), a pair of "nor" gates 516, 518 (7402), and a pair of "nand" gates 520, 522 (7410). The output of "nand" gate 520 is connected to the clock input of D flip-flop 504 and to the "nor" gates 506 and 508. The "nand" gate 522 is connected to a group of eight amplifiers 524, 526, 528, 530, 532, 534, 536, 538 (8093), to activate the amplifiers when the output of the "nand" gate 522 is high.

A FIFO input proceeds in the following manner: when the DA (Data Available) line is high, and the FIFO is ready (Composite Input Ready, CIR, is high), JK flip-flop 424 is set by the next $\phi_2$ clock pulse. The following $\phi_2$ clock pulse generates a CSI (Composite Shift In) pulse which is 250 nanoseconds wide, and which serves to shift the 16-bit word (FIG. 8) into the FIFO. The CSI pulse appears at least 500 nanoseconds after the DA line goes high, a delay required to insure the presence of valid data on the terminal inerterface RR outputs.

The next $\phi_2$ clock pulse resets the JK flip-flop 426. Then, when CIR goes low, D flip-flop 428 is clocked and it serves as a latch for the negative CIR pulse. The $\overline{Q}$ output of the D flip-flop 428 inhibits further generation of CSI pulses by clamping the CL terminal of the JK flip-flop low.

A reset pulse (DRRNAND) is then sent to the DRR flip-flop in the selected terminal interface to reset the flip-flop. The DRRNAND line is buffered by the four buffers 444, 446, 448 and 450 to provide a fan-out of sixty-three. A 250 nanosecond waiting time is provided to assure that the DR line of the selected terminal interface will be low before the next operation. The next $\phi_2$ clock pulse sets the JK flip-flop 426. When both the D flip-flop 428 and the JK flip-flop 426 are set, the next $\phi_2$ clock pulse resets the D flip-flop 428. When the D flip-flop output goes low, the two flip-flops 426 and 428 are cleared, and the logic is in its original state, ready to accept new data.

On the FIFO output side, the "FIFO Ready" signal at the output of "nand" gate 502 serves as a status flag, indicating to the microprocessor 34 that a data/address pair is ready to be picked up. Separate shift-out signals are generated for the two bytes. The data outputs are externally tri-state buffers, the buffers being enabled by the shift-out lines. The system reset pulse (NMR) resets D-flip-flop 594. When the microprocessor 34 provides the "input" signal (IDB is high), and issues the correct address (A6 is high, A7 is low).

The terminal number byte ($D_0$–$D_7$) (FIG. 8) is clocked out of the FIFO memory and onto the data bus. At the positive edge of the NMR pulse, the flip-flop 504 toggles, and at the next processor input command, the data byte is clocked out of the system. At the positive edge of the pulse, the flip-flop 504 toggles again, and is now in its original state.

Figure 9:
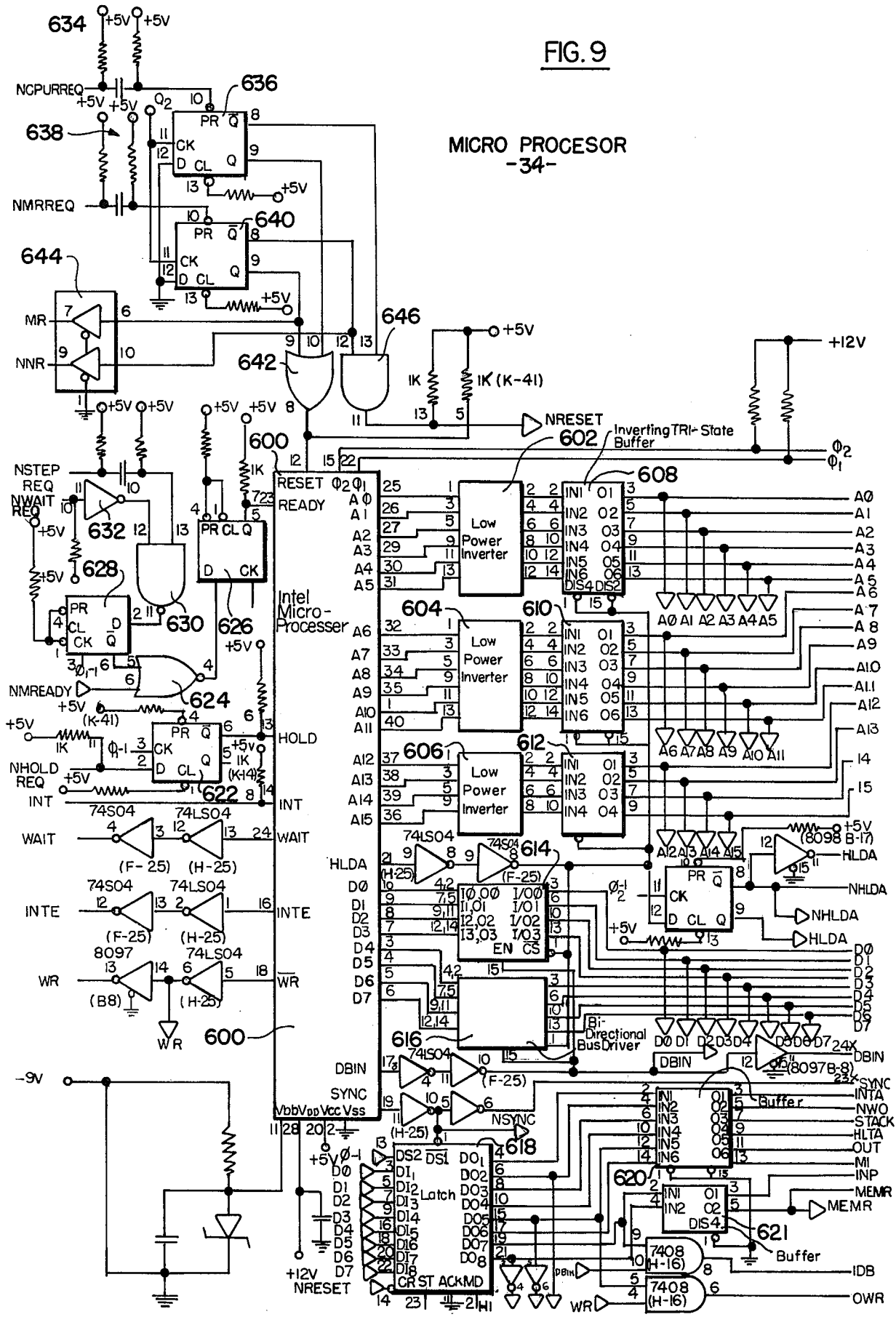
FIG. 9 represents a logic diagram of a microprocessor which is included in the multiplexer/demultiplexer sub-system of FIG. 2.

The microprocessor module 34 of FIG. 2 is shown in logic detail in FIG. 9. The microprocessor accepts incoming data from the FIFO 32, buffers the data, and delivers the data in blocks to the synchronous transmitter 42. In the reverse direction, the microprocessor receives the data messages from the synchronous receiver 48, and transfers pairs of bytes to the Output Buffer Register 49 (FIG. 2). In addition, the microprocessor performs various auxiliary functions, such as automatic terminal identification, echoing of characters back to the terminals, acknowledgment of correctly received blocks, and retransmission of messages which were not timely acknowledged. The microprocessor includes an INTEL microprocessor integrated circuit 600 (8080). The processor 600 receives its 2.027 MHz system clocks ($\phi_1$, $\phi_2$) from a separate circuit. The clock frequency of 2.027 MHz was chosen because from this frequency all the necessary terminal baud rates can be easily derived by simple frequency division. The address bus lines A0–A15 are buffered by low power inverters 602, 604, 606 (74LS04), and inverting tri-state buffers 608, 610, 612 (8098) which provide a fan-out of twenty.

The eight data bus lines D0–D7 are buffered by two 4-bit bidirectional bus drivers 614, 616 (8216) which provide a fan-out of fifteen. The buffered data lines lead to the R/W memory 36 (FIG. 2) for data input and output, and to the read-only memory 38 for data input, over the data bus. The data bus is fed into an eight-bit latch 618 (8212) which is triggered by the SYNC pulse from the microprocessor 600 and, at this time stores the current machine status. The latched status bits are used for enabling the memories and the data bus. After passing through buffers 620, 621 (8097), the status bits are placed at the disposal of the other modules which use them as control commands.

A separate DBIN (Data Bus In) signal is a command issued by the microprocessor 600, and it serves as the timing information for placing the input data on the data bus. The HLDA (Hold Acknowledge) signal generated by the microprocessor 600 has an important function in that during normal program execution, this signal enables the buffered address and data bus lines for memory and input/output addressing and data transfer to and from the microprocessor 600. When the microprocessor is in the HOLD state, the resulting HOLD signal forces the data and address buses into their high impedance state. The buses can then be controlled by the Program Loader for direct access to the R/W memory 36. Interrupts are requested by the block/acknowledgment time-out counter 44 by setting the INT line high, and they are acknowledged by the low power buffered Interrupt Enable (INTE) line.

In order to gain direct access to the memories, which is required for loading the program into the R/W memory 38 using the Program Loader, the microprocessor 600 must be put into the HOLD state. In this mode, the bus lines are floating, and the external device can control the address and data bus for memory transfers. A HOLD request is generated from outside the microprocessor system by clamping the NHOLDREQ line low. This line is connected to the D input of a latching flip-flop 622 (7474), which is clocked by the system clock $\phi_1$, and which produces a synchronized HOLD signal at its $\overline{Q}$ output. This latter signal is applied to the HOLD input of the microprocessor 600, and it forces the microprocessor into the HOLD state after the current machine cycle is completed.

Read or write operations are initiated by either the direct memory access circuit 40 (FIG. 2) when the processor is in its HOLD state, or by the processor itself when it is in its RUN mode. The R/W memory inputs are directly tied to the data bus, while the R/W memory and read-only memory outputs are connected to the data bus by way of the Tri-state buffers 608, 610, 612 which are controlled by the memory read signals. After a memory Read or Write operation has been performed, the microprocessor 600 must be informed of its completion by setting its READY input high. The READY signal is generated synchronously in a programmable counter, and is introduced to the microprocessor 600 through a logic circuit which comprises a "nor" gate 624 (7432), a D flip-flop 626 (7474), a D flip-flop 628 (7474), a "nand" gate 630 (7400, and an inverting amplifier 632 (7404).

Two different types of resets are generated in the system, namely, the Master Reset (MR) and the Microprocessor Reset. The Master Reset (MR) clears the microprocessor 600 as well as all peripherals. However, since it may be desirable to maintain the status of the input/output units while the microprocessor 600 is reset, an additional reset is provided which clears the microprocessor only. External reset signals are applied to the NMRREQ and NCPURREQ terminals respectively. A first R-C network 634 responds to the NCPURREQ reset signal to preset a flip-flop 636 (7474), and an R-C network 638 responds to the NMRREQ reset signal to preset a flip-flop 640 (7474). The Q outputs of the flip-flops 636 and 640 are applied through an "or" gate 642 (7432) to the reset input of the microprocessor 600, so that the microprocessor is RESET whenever either of the flip-flops is set. The Q and $\overline{Q}$ output terminals of the flip-flop 640 are applied through an amplifier 644 (8097) to provide master reset signals (MR and NMR) only when the flip-flop 640 is set. The reset outputs of the flip-flops 636 and 640 are applied to an "and" gate 646 (7408), whose output provides a complement reset signal (NRESET). The flip-flops are cleared synchronously by the $\phi_2$ system clock, so that the flip-flop outputs produce reset signals of about 2 microseconds.

Figure 10:
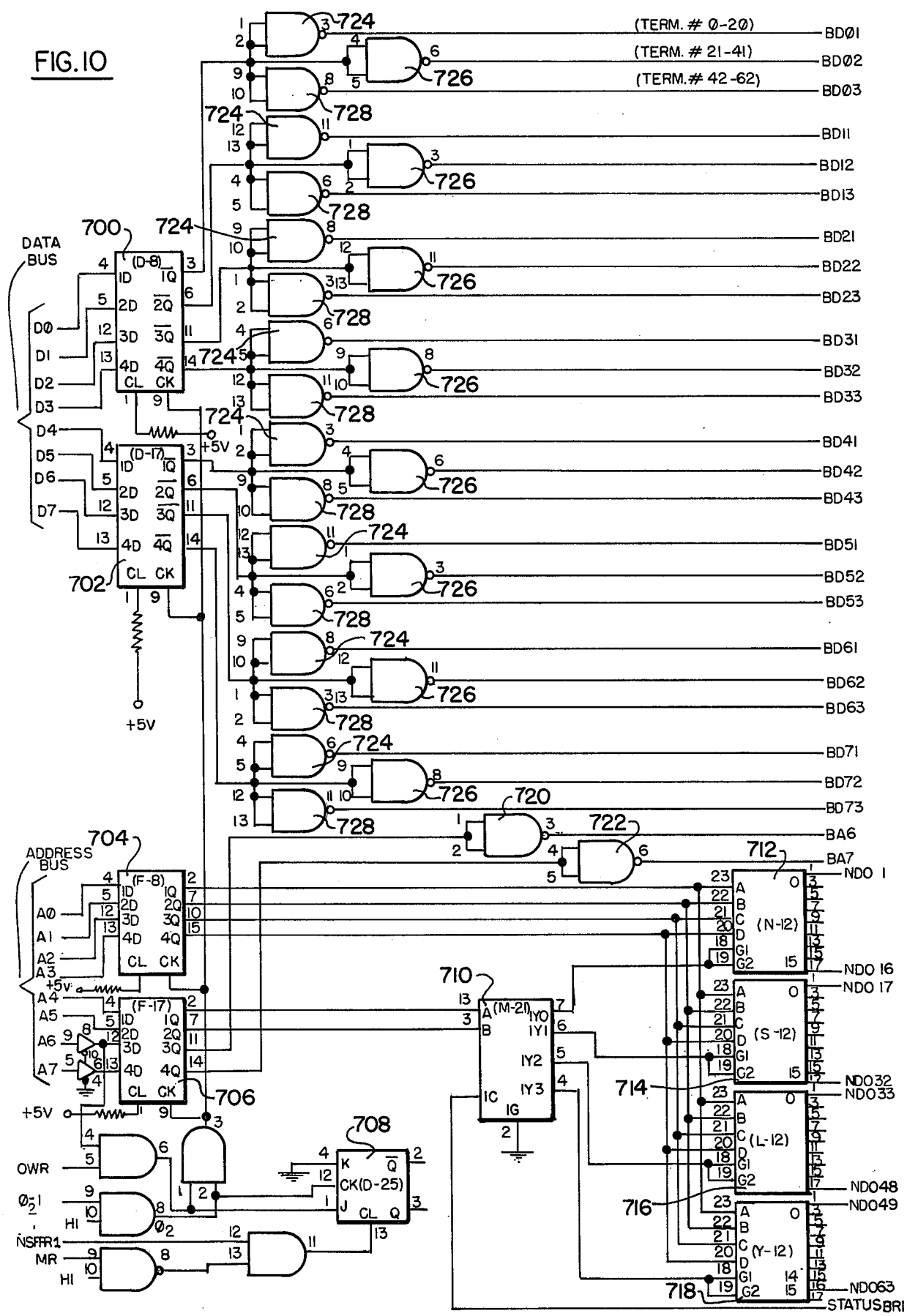
FIG. 10 is a logic diagram of an output buffer register demultiplexer included in the sub-system of FIG. 2.

The function of the Output Buffer 49 in FIG. 2 is to accept a data byte and a terminal number from the microprocessor 34 by way of an output instruction, and to deliver the corresponding data to the correct terminal or computer port. The output buffer, as shown in FIG. 10, consists of four quadruple D flip-flops 700, 702, 704 and 706 (74175). When the microprocessor issues an output instruction (OWR is high), the address lines A6 and A7 are interrogated. A low line A6 and a high line A7 indicates that the data byte is to be transferred to one of the terminal ports. Now, the information on the data and address bus is clocked into the register by the next $\phi_2$ clock pulse. The $\phi_2$ clock pulse also clocks a JK flip-flop 708 (74107), which serves as a status flag for the microprocessor to indicate whether the buffer is full or empty, and which enables the demultiplexer.

The demultiplexer is composed of one 2/4 decoder 710 (74155) and four 4/6 decoders 712, 714, 716, 718. The inputs to the demultiplexer are the six low-order bits of the buffered address byte. Depending on this 6-bit address which resembles the terminal number, one of the 63 demultiplexer outputs (ND01-ND063) will go low, thus selecting one of the terminal interfaces of FIG. 2. Bits 6 and 7 of the address byte are buffered by "nand" buffers 720, 722 (7437). The BA6 and BA7 bits are used by the terminal interface circuits to determine whether the buffered data byte contains a character or UART clock/format information.

The buffered data bus information has to be transferred to all the terminal interface circuits 1–63 of FIG. 2. The necessary fan-out is obtained by using three "nand" buffers 724, 726, 728 (7437) for each data line. After the selected terminal interface has accepted the data byte, it issues a Status Flip-Flop Reset (SFFR1) which clears the status flip-flop 708, and the Output Buffer is now ready to accept new data.

Figure 11A:
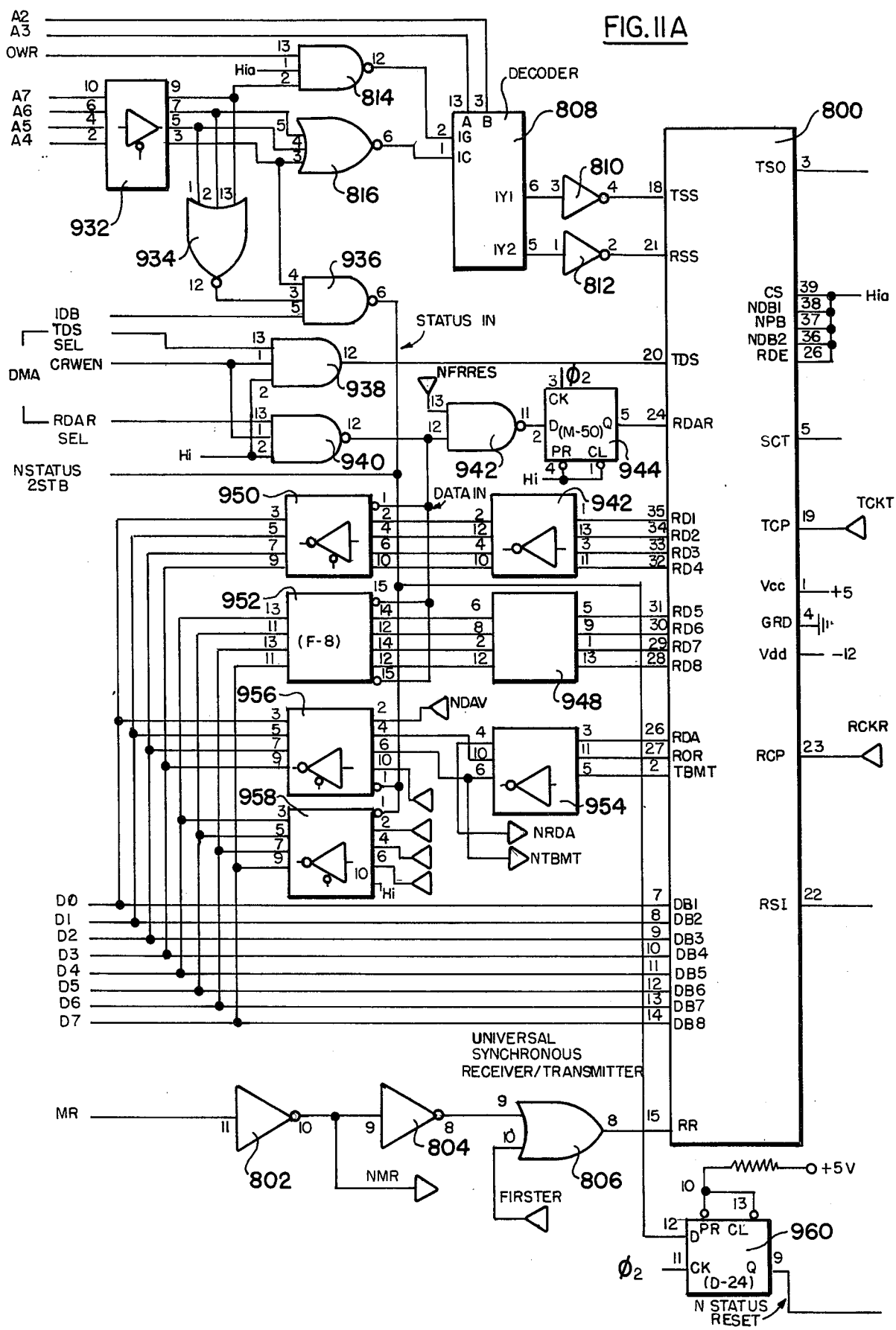

The synchronous communication line interface module which incorporates the synchronous transmitter 42 and synchronous receiver 48 of FIG. 2 is shown in FIG. 11. The transmitter section sends synchronization characters over the communication line when no data block is being transmitted; accepts data blocks byte-by-byte from the R/W memory 36 of FIG. 2 by way of the direct memory access register 40, transforms the data bytes into a serial form, and transmits them over the communication line; generates a 16-bit cyclic redundancy check (CRC) code and adds the code to the end of each data stream.

The synchronous receiver 48 searches for a data byte in the incoming serial bit stream from the communication line 46; assembles the data byte into a byte parallel form and delivers them to the microprocessor 34; performs error checking and sets the error status flag in status register II if there is an error in the received block; and checks for invalid characters, and notifies the microprocessor 34 by setting the ABORT status flag.

The main component of the system of FIG. 11 is a universal synchronous receiver/transmitter (USRT) 800 (COM2601). After power is turned on, the universal synchronous receiver/transmitter (USRT) is reset by the master reset strobe (MR), and the desired SYNC character is loaded into the transmitter/receiver SYNC register by the microprocessor 34. The SYNC character is identified as 01111110.

The master reset signal (MR) is introduced to the USRT 800 through an inverting amplifier 802 (7404), through a second inverting amplifier 804 (7404), and through an "or" gate 806 (7432). The desired SYNC character is loaded into the transmitter "receiver SYNC register" of the USRT to a decoder 808 (74155) which differentiates between the different output instructions. The decoder is coupled to the USRT through inverting amplifiers 810 and 812 (7404). The decoder also has a "nand" gate 814 (7410) and a "nor" gate 816 (7427) associated therewith.

When the transmitter 42 has no data to send over the communication line, it continuously extracts SYNC characters from its SYNC register, and indicates this by clamping the SCT line high. The SYNC characters are sent to the interface connector 818 by way of a multiplexer 820 (74153), and a level converter 822 (75150).

When a data byte is waiting to be transmitted, the transmitter data strobe of the USRT is pulsed, and the byte is latched in the transmitter data register. The next character transmitted is then extracted from this register, and the SCT line is kept low. Now, a synchronous counter 824 (74163) is enabled which inhibits one line clock pulse in the case of more than five consecutive 1's contained in the serial data stream. This clock inhibition corresponds to an insertion of a zero and permits distinction between data and SYNC characters at the receiving end.

In addition, an error code generator 826 (8503) is now activated. After a complete data block has passed, the error code generator output is switched to the communication line via the multiplexer 820, and the sixteen CRC check bits are transmitted. The necessary control signals are generated by a synchronous counter 828 (74163) which is enabled as soon as the last data byte has passed, at which time SCT goes high. After sixteen bits, the counter 824 sets a JK flip-flop 830 (74107) with its carry output, and the output of the flip-flop resets the error code generator 824. The SYNC carriers are again transmitted over the communication line until the next data block arrives from the microprocessor 34 of FIG. 2.

The incoming serial data passes through a line receiver 832 (74154) which transfers the signal into a TTL compatible format. The data is then shifted into a synchronous eight-bit shift register 834 (74164) through an inverting amplifier 836 (7404). Appropriate detection logic is provided at the output of register 834. This logic includes a "nand" gate 838 (7430), a "nor" gate 840 (7402), an "and" gate 842 (7408), an inverting amplifier 844 (7404), a "nor" gate 846 (7402), an "and" gate 848 (7408), an "and" gate 850 (7408), and three JK flip-flops 852, 854, 856 (74107). This detection logic continuously checks for an invalid character, that is more than six consecutive 1's in the data stream, and this results in an ABORT message signal to the microprocessor by a status flag. The detection logic also continuously checks for a synchronization character (FRAME). The $Q_H$ output of shift register 834 is fed to the RSI (Receiver Shift In) input of the USRT 800 as well as into an error code generator 858 (8503).

A part of the receiver logic, consisting of a synchronous counter 860 (74163) and two JK flip-flops 862 and 864 (74107) serves to search for the first occurrence of a FRAME after a received data block, and this logic generates a signal pulse sixteen clock pulses later. This signal pulse is used to check the error status of the error code generator 858. If an error is detected, the ERROR status flag is set. The processor ignores the received ERROR block, and deletes it from the R/W memory. Moreover, no acknowledgment is sent to the transmitter.

The TSO output of the USRT 800 is fed to the error code generator 826 and to the multiplexer 820 through an amplifier 866 (8093). The SCT output of the USRT is fed to the clear terminals of the counter 824 and of the JK flip-flop 830 through an amplifier 868 (8093). The output of amplifier 868 is also connected to a "nand" gate 870 (7400), an "and" gate 872 (7408) and to the clock input of a JK flip-flop 874 (74107). The "and" gate 872 and the $\bar{Q}$ output of flip-flops 874 are coupled through an "or" gate 876 (7432) to a "nand" gate 878 (7400) and through an inverting amplifier 880 (7404) to synchronous counter 828. The output of "nand" gate 870 is coupled through an inverting amplifier 882 (7404) to the A input of multiplexer 820. The Y output of multiplexer 820 is connected to an "and" gate 844 (7408) which, in turn, is connected through inverting amplifier 886 (7404) to the level converter 822.

The $Q_B$ output of synchronous counter 828 is coupled through an inverting amplifier 888 (7404) to a "nand" gate 890 (7410). The "nand" gate in turn is connected to a further "nand" gate 892 (7400) which connects to an output NTCKT, and through an inverting amplifier 894 (7404) to an output TCKT.

The logic associated with synchronous register 834 includes a synchronous counter 896 (74163). The $Q_B$ output of counter 896 is coupled through an inverter amplifier 898 (7404) to a "nand" gate 900 (7410). The output of "nand" gate 900 is connected to a further "nand" gate 902 (7400), and the latter "nand" gate produces the term RCKR through an inverting amplifier 904 (7404), and directly produces the term NRCKR. The synchronous counter 860 has associated with it a "nor" gate 906 (7402), an "and" gate 908 (7408), an "and" gate 910 (7408), an inverting amplifier 912 (7402), a further inverting amplifier 914 (7404), a "nand" gate 916 (7400).

The FRAME signal is also introduced to an inverting amplifier 918 (7404) which is connected to a "nand" gate 920 (7400). The output of "nand" gate 920 is connected to a "nor" gate 922 (7432), which, in turn, is connected to the clear (CL) input of a JK flip-flop 924 (7476). The output of "nor" gate 906 is coupled through an inverting amplifier 926 (7404) to the clock input of flip-flop 862. The Q output of flip-flop 864 is connected to an "or" gate 928 (7432), and the $\bar{Q}$ output of that flip-flop is connected to an "or" gate 930 (7432).

The decoder 808 also has associated with it an amplifier 932 (8097), a "nor" gate 934 (7427), a "nand" gate 936 (7410). The input to the TDS terminal of USRT 800 is introduced through an "and" gate 938 (7411), and the input to the RDAR terminal is introduced through a "nand" gate 940 (7410), through a "nand" gate 942 (7400), and by way of a D flip-flop 944 (7474). The RD1-RD8 output terminals of USRT 800 are coupled through inverting amplifiers 946 and 948 (74LS04) to further inverting amplifiers 950, 952 (8098). The RDA, ROR and TBMT outputs of the USRT 800 are coupled through an inverting amplifier 954 (74LS04) to a further inverting amplifier 956 (8098). Inverting amplifier 956 is also connected to a further inverting amplifier 958 (8098). The system also includes a D status flip-flop 960 (7474).

The receiver section of the system of FIG. 11 also serves to remove any zeros after five consecutive 1's which were inserted by the transmitter. This is accomplished by inhibiting the receiver clock for one clock pulse when five 1's are received, and when no SYNC character (01111110) is detected.

The block acknowledgment time-out circuit 44 of FIG. 2 is shown in logic detail in FIG. 12. The circuit of FIG. 12 constitutes two independent functional units, namely a block time-out counter and an acknowledgment time-out counter. A block of data is transmtited by the synchronous transmitter 42 of FIG. 2 over the communication line 46 as soon as a block of data is filled up to its prescribed maximum size (for example, 256 bytes), or when a certain time has elapsed since the first character entered a block, that is, the block time-out interval. The block time-out counter serves as a clock which notifies the microprocessor of the elapsed time by generating an interrupt request.

To assure that data blocks are correctly received by the synchronous receiver 48 of FIG. 2, all data blocks have to be acknowledged before they can be deleted from the transmitting processors buffer memory. After a certain acknowledgment wait period, blocks which have not been acknowledged are automatically retransmitted under the assumption that they have not been received correctly. The acknowledgment time-out circuit notifies the processor that the wait period has passed by generating an acknowledgment time-out interrupt. The hardware of the two circuits is identical.

The block time-out circuit includes an 8-bit counter made up of two blocks 1000, 1002 (74191). The data inputs are loaded into the counter through amplifiers 1004 and 1006 (8097). Pin 5 of amplifier 1006 is connected to a "nor" gate 1008 (7402), and through an inverting amplifier 1010 (7404) to a "nor" gate 1012 (7402). The "nor" gates 1008 and 1012 are connected respectively to the K and J inputs of a JK flip-flop 1014 (74107), and the output of "nor" gate 1012 is connected through an inverting amplifier 1016 (7404) to the load (LD) inputs of counter blocks 1000 and 1002.

A latch 1018 is connected to the counters (74123), and the output of the latch is connected to the clock input of a block flip-flop 1020. The Q output of the block flip-flop is connected to pin 12 of an amplifier 1022 (8097). A second amplifier 1024 (8097) is connected to amplifier 1022.

The acknowledgment time-out section of the circuit of FIG. 12 includes an eight-bit counter made up of a pair of blocks 1026 and 1028 (74191). Associated with the counter is a JK flip-flop 1030 (74107), and the flip-flop has a "nor" gate 1032 (7402) connected to its J input, and a "nor" gate 1034 (7402) connected to its K input. A decoder 1036 (74155) has its 2Y1 output connected to "nor" gates 1008 and 1012, and its 2Y2 output connected to "nor" gates 1032 and 1034. A "nand" gate 1038 (7400) is connected to the 2G input of the decoder 1036. A frequency divider 1040 (7490) responds to the 800 Hz clock to produce an 80 Hz clock for counter 1026, and a 160 Hz clock for counter 1000.

The output of "nor" gate 1032 is also connected to the LD inputs of counters 1026, 1028 through an inverting amplifier 1042 (7404). A latch 1044 (74123) is associated with the counters 1026, 1028, and the latch is connected to an acknowledgment JK flip-flop 1046 (7474). The Q output of the acknowledgment flip-flop is connected to pin 12 of amplifier 1022. An "or" gate 1048 (7432) connects the 1Q output of latch 1018 and 2Q output of latch 1044 to an INT REQ D flip-flop 1050 (7474). The Q output of flip-flop 1050 is connected to an amplifier 1052 (8093). The CL input of flip-flop 1050 is connected to the output of a "nor" gate 1054 (7402) which receives its input from an inverting amplifier 1056 (7404), and from an amplifier 1058 (8093). "Nor" gate 1054 is also connected to "nor" gate 1060 (7402), and to "nand" gate 1062 (7400). "Nand" gate 1062 receives its input through an amplifier 1064 (8093). "Nand" gate 1062 is also connected to a D flip-flop 1066 (7474). The D flip-flop receives its clock input through an inverting amplifier 1068 (7404).

At the beginning of the time-out period, the synchronous eight-bit presettable counters 1000, 1002 and 1026, 1028 are enabled by the microprocessor. Bit 7 of the data bus (D7) sets the JK flip-flops 1014 and 1030. The initial count on the data bus line D0–D6 is then loaded into the counter inputs. Data bus line D7 resets the JK flip-flops 1014 and 1030, and the outputs from the flip-flops disable the respective counters. When either counter is not stopped, it issues an MIN strobe after its count has reached zero. This strobe sets the interrupt request flip-flop 1050. The Q output of the interrupt request flip-flop 1050 is amplified by amplifier 1052 and introduced to the INT input of the microprocessor.

When the processor recognizes the interrupt request, it answers by issuing an interrupt acknowledge (INTA) pulse which clears the flip-flop 1020 and 1046. In return, a restart instruction (RST) has to be placed on the data bus which makes the processor jump to a specific memory address. The RST instruction uses the latched time-out signal of the module that caused the interrupt (bit D3: block time-out bit D4: acknowledgment time-out). Bit D5 if RST is zero and the remaining five bits are "1". After the restart instruction has been delivered to the data bus, the module that caused the interrupt is reset. It remains stopped until it receives a new START instruction. The count frequency established by the unit 1040, together with the initial count, determines the time-out interval. An interval of 0.8 seconds was specified as maximum time-out period for the block time-out counter (1000, 1002), and 1.6 seconds were specified as the maximum time-out period for the acknowledgment time-out counter (1026, 1028).

The logic details of one section of the read/write random access memory 36 are shown in FIG. 13. The particular section is addressed by the address lines A10–A13. The memory circuit includes four "and" gates 1100, 1102, 1104 and 1106 of the type designated 7408, and which are connected as shown. The circuit also includes a "nor" gate 1108 of the type designated 7425, and an inverting amplifier 1110 of the type designated 7404. Also included in the circuit is a decoder 1112 of the type designated 74155. The data lines D0–D7 are connected into the memory through inverting amplifier blocks 1114 and 1116 of the type designated 8216. The illustrated section is composed of a plurality of random access memory cells, such as the cell 1118, which may be of the type designated 2102A.

Figure 14:
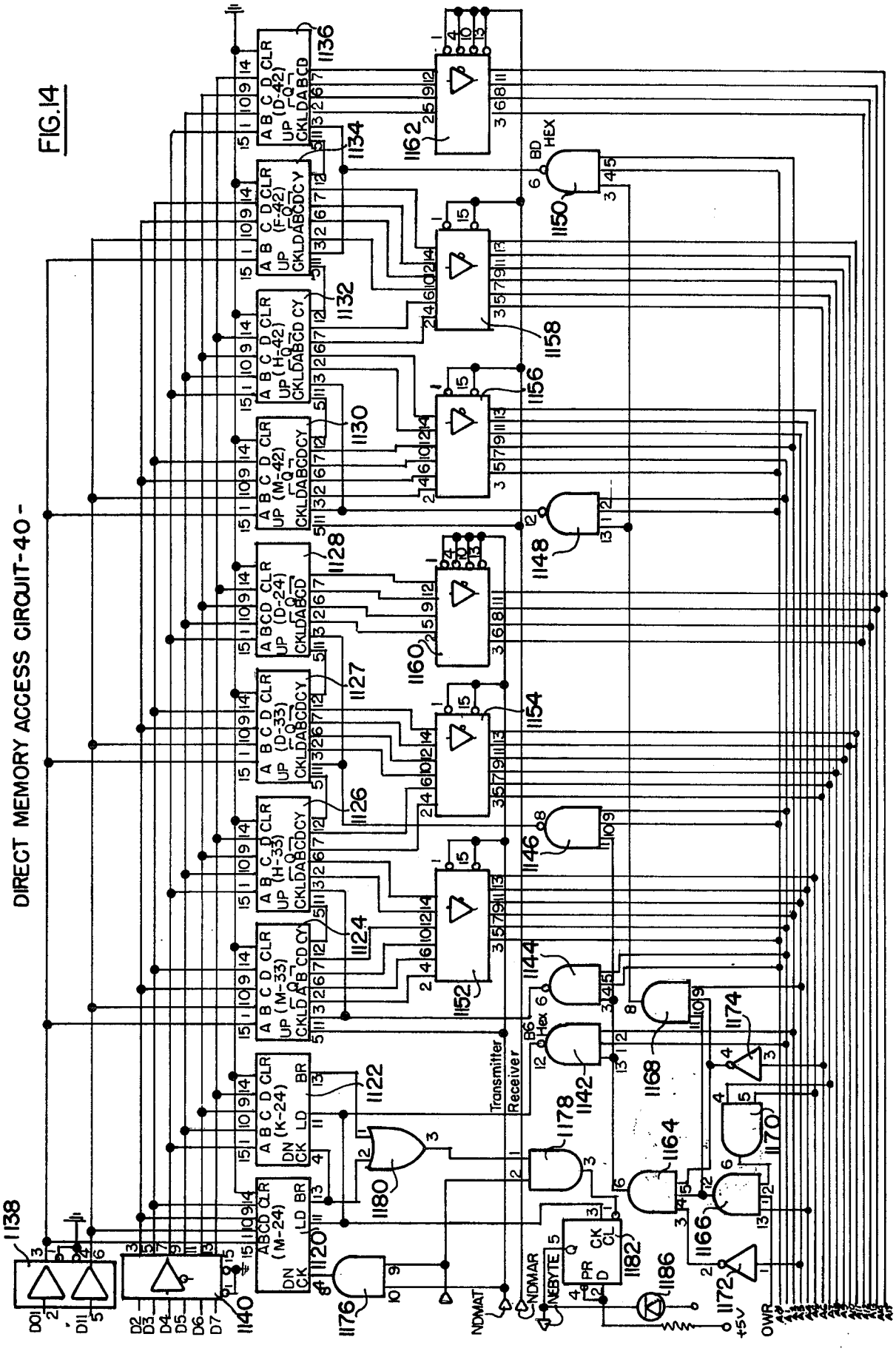
FIG. 14 is a logic diagram of a direct memory access circuit for the memory of FIG. 13.

The direct memory access circuit 40 is shown in logic detail in FIG. 14. The circuit includes a register formed of ten stages 1120, 1122, 1124, 1126, 1127, 1128, 1130, 1132, 1134, 1136, each of which may be of the type designated 74193. The data D0–D7 is fed into the register stages through an amplifier block 1138 which may be of the type designated 8093, and through an amplifier block 1140 which may be of the type designated 8097.

The address lines A0–A15 are connected into the circuit through a plurality of "nand" gates 1142, 1144, 1146, 1148 and 1150, which may be of the type designated 7410; and through a plurality of amplifier blocks 1152, 1154, 1156 and 1158 which may be of the type designated 8097, and through a pair of amplifier blocks 1160 and 1162, which may be of the type designated 8093; and also through a plurality of "and" gates 1164, 1166 and 1168 which may be of the type designated 7411; through an "and" gate 1170 which may be of the type designated 7408, and through a pair of inverting amplifiers 1172 and 1174 which may be of the type designated 7404.

The circuit also includes a pair of "and" gates 1176 and 1178 which may be of the type designated 7408, and "or" gate 1180 which may be of the type designated 7432, and a flip-flop 1182 which may be of the type designated 7474. A light emitting diode 1186 is connected to the Q output of the flip-flop, and is used to indicate when the flip-flop is in its set state.

Figure 15:
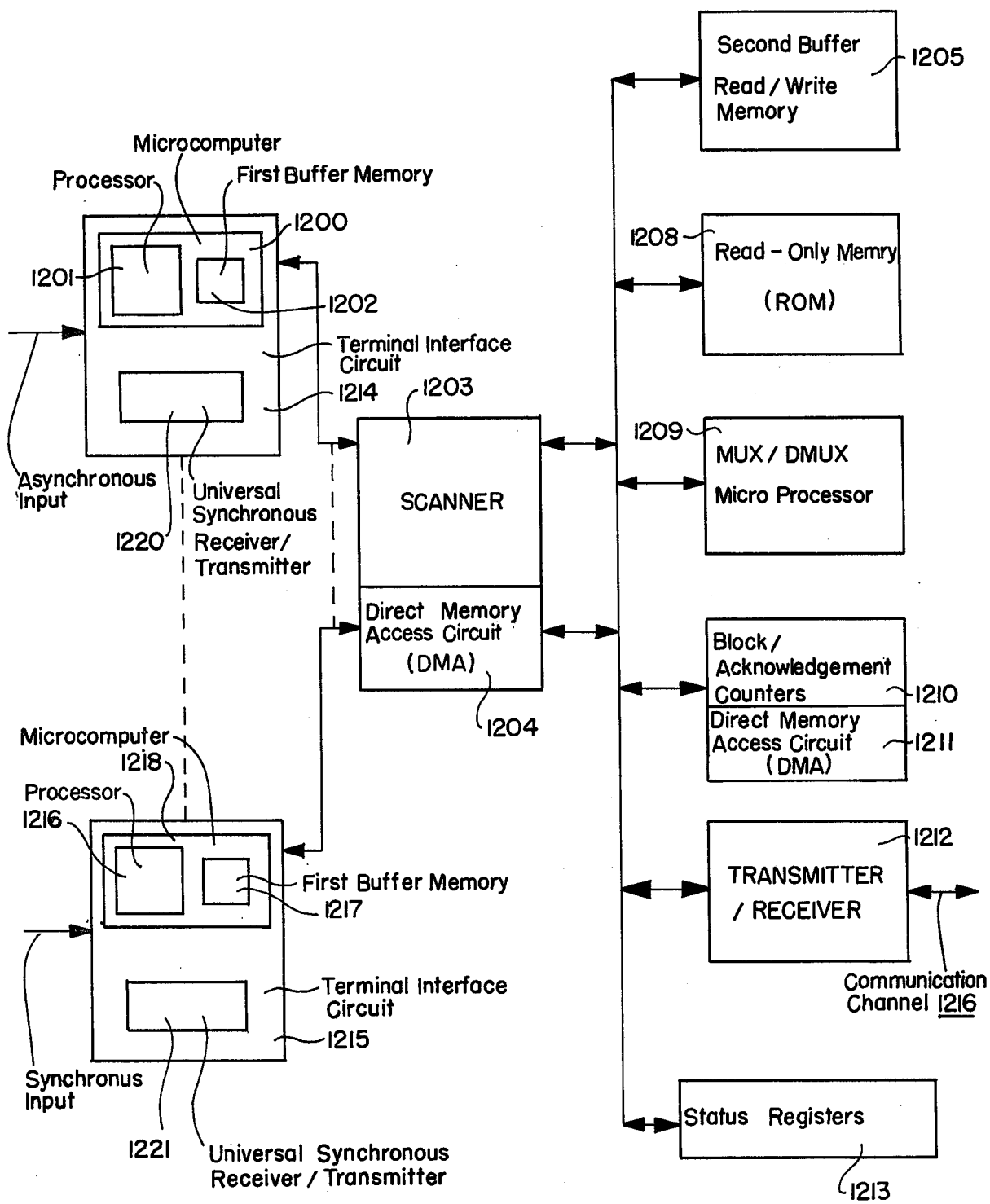
FIG. 15 is a block diagram of a statistical multiplexing system incorporating the concepts of the invention in accordance with a second embodiment.

Due to significant cost reductions of microcomputers (processors with memories) on LSI semiconductor chips (Intel 8048), many functions can now be economically and flexibly implemented by using such microcomputer chips. As a result, an alternative implementation of the first buffer memory (block 32 in FIG. 2) of the statistical multiplexing system of the invention may be formed, as shown in FIG. 15. The system of FIG. 15 uses such a microcomputer in each terminal interface circuit. The microcomputer handles the serial-to-arallel or parallel-to-serial function of each interface circuit, and uses its random access memory as the first buffer memory. The first buffer memory 32 of the system of FIG. 2 is replaced, therefore, in the system of FIG. 15 by a separate first buffer memory in each terminal interface circuit, with each such buffer memory being a pair of a microcomputer included in each terminal interface circuit.

For example, in the system of FIG. 15, a microcomputer 1200, which is formed of a processor 1201 and memory 1202 is included in a terminal interface circuit 1214. The terminal interface circuit 1214, and other similar terminal interface circuits process signals from associated asynchronous terminals. As will be described, further terminal interface circuits, such as terminal interface circuit 1215, each of which includes a microcomputer 1218, are also included to process signals from associated synchronous terminals. The microcomputer 1218 includes a processor 1216 and a memory 1217. As will also be described, a universal synchronous receiver/transmitter 1220 may be included in each of the interface circuits, such as interface circuit 1214; and a universal synchronous receiver/transmitter 1221 may be included in each of the terminal interface circuits, such as terminal interface circuit 1215.

The terminal interface circuits are coupled to a scanner circuit 1203 and a direct memory access circuit (DMA) 1204. The system of FIG. 15 also includes a second buffer read/write memory 1205 which, in turn, includes dedicated output buffers, a shared buffer pool, and a working space, as will be described. The system also includes a read-only memory (ROM) 1208, a microprocessor 1209, block/acknowledgment counters 1210, and an assoiciated direct memory access circuit (DMA) 1211, and status registers 1213. Also, the system includes a transmitter/receiver 1212 which transmits and receives signals to and from a common communication channel.

In the system of FIG. 15, the microcomputer 1200 handles the serial-to-parallel or parallel-to-serial interface function and uses its memory 1202 as the first buffer memory. Thus, the first buffer memory 32 of the embodiment of FIG. 2 is replaced by the first buffer memory 1202 in each terminal interface circuit in the system of FIG. 15. All the input characters from any one terminal are formed into a sub-block (with a sub-block size count byte and a terminal address label) in the terminal interface circuit 1215. The scanner circuit 1203 periodically initiates the transfer of the full or partially full data sub-blocks from each first buffer memory 1202 to the second buffer memory 1205 to form the sub-blocks into data blocks for transmission over the communication channel.

The system of FIG. 15 greatly reduces the computation load of the multiplexer/demultiplexer microprocessor 1209 as compared with the load on the microprocessor 34 in the embodiment of FIG. 2. In the demultiplexer of the system of FIG. 15, a similar scanner circuit 1203 periodically scans the dedicated output buffers of the second buffer read/write memory 1205 for each terminal under the control of the microprocessor 1209, and transfers data sub-blocks from the dedicated output buffers to the first buffer memory 1202 in each terminal interface circuit. The microcomputers 1200 in the terminal interface circuits then distribute data to the respective terminals. Direct memory access (DMA) circuits 1204 are used in conjunction with the scanner circuit 1203 to speed up the transfer of data sub-blocks from and to the first buffer memory 1202 and to and from the dedicated output buffers of the second buffer memory 1205, and to reduce the microprocessor load for handling the transfer of data sub-blocks.

In the case of handling high speed asynchronous input data (for example, 1200 baud or higher), the processing speed of the microcomputer 1200 may not be fast enough to handle all the tasks. In such a case, the serial-to-parallel and parallel-to-serial interface function can be handled by adding a universal asynchronous receiver/transmitter 1220 into each terminal interface circuit 1214. The microcomputer 1200 is used to control the universal synchronous receiver/transmitter 1220 to cause it to form its serial-to-parallel and parallel-to-serial interface functions and to form data sub-blocks in the first buffer memory 1202, as well as to distribute received data sub-blocks to its terminal.

The send and receive operations of the system of FIG. 15 remain the same as in the system of FIG. 2. For the send operation, when a data block reaches its predetermined maximum size or when the data block reaches its time-out limit, the data block is transferred from the working space of the second buffer memory 1205 by way of the direct memory access circuit 1211 to the transmitter 1212 for data transmission over the communication channel. For the receiver operation, a data block from the communication channel is received by the receiver portion of unit 1212 and transferred to the working space of the second buffer memory 1205 by way of the direct memory access circuit 1211.

The demultiplexing function is carried out by the microprocessor 1209. The read-only memory 1208 is used for storing the resident program. The second buffer memory, as indicated, includes a working space, dedicated output buffers for each terminal, and a shared buffer pool. When a multiplexed data block is received over the communication channel by the receiver portion of unit 1212, the receiver performs zero deletion and error checking operations, and stores the correctly received data block in the shared buffer pool portion of the second buffer memory 1205 by way of the direct memory access circuit 1211. Incorrectly received data blocks are discarded. The microprocessor 1209 then reads the status of the status register 1213, and transmits the positive or negative acknowledgement signal together with its block sequence number, over the communication channel to the sender at the remote stations, either as a control block or as an insert in the next multiplexed data block being transmitted to the remote station.

Figure 19:
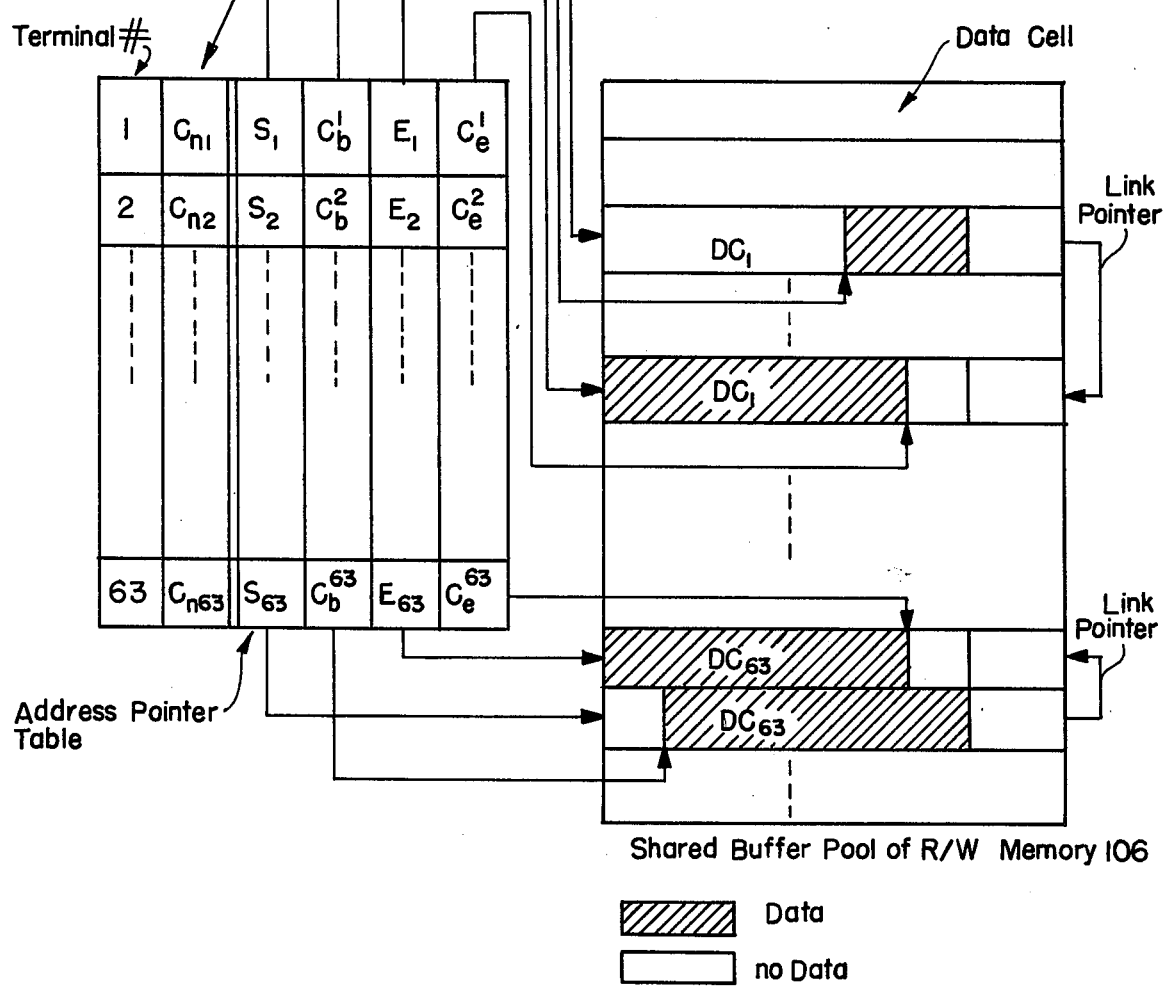
FIG. 19 is a representation of the detail organization of a shared buffer memory for dynamic buffer management for the statistical multiplexing system of FIG. 15.

Each terminal has a dedicated buffer of, for example, 32 characters. The overflow traffic from the individual dedicated buffers is stored in the shared buffer pool of the read/write and second buffer memory 1205. A dynamic buffer management system is employed for the shared buffer pool as shown in FIG. 19. The shared buffer is formed by partitioning the shared buffer into fixed size data cells of, for example, sixty-four characters; and into an address pointer table, as shown in FIG. 19. Each data cell is used for storing data from the same terminal. For each data cell, there is a link pointer which points to the next data cell to be linked from the current data cell.

The address pointer table consists of four address points S, $C_b$, E and $C_e$, and a cell count $C_n$ for each terminal. Pointer $S_i$ points to the starting address of the data cell for the $i^{th}$ terminal. $C_b{}^i$ is the byte count (off-set) pointer which points to the location for outputting a data byte from the data cell pointed by $S_i$. Pointer $E_i$ points to the address of the last received data cell for the $i^{th}$ terminal, and $C_e{}^i$ is the byte count (off-set) pointer which points to the location for storing an incoming data byte to the data cell pointed by $E_i$.

For example, pointer $S_6$ is for use for locating the data cell to output from the shared buffer pool to the dedicated individual buffer $B_6$ of the sixth terminal. With pointers $S_6$ and $C_b{}^6$, the system is able to point to the memory location for outputting data from the shared buffer pool to the dedicated buffer for the sixth terminal. Likewise, with pointers $E_6$ and $C_e{}^6$, the system is able to connect the incoming data overflow from the dedicated output buffer for the sixth terminal with its last received data that was stored in the shared buffer pool. Whenever a data cell is empty, that is, when the byte count $C_b$ is equal to the cell size, then that cell is returned to the shared buffer pool.

Such dynamic buffer management as described above allows sharing of the buffer pool and thus increases the efficiency of utilized buffer space. Furthermore, the link pointer is used for each data cell, rather than for each data sub-block, as was the case in the previous embodiment. Since each data cell does not contain address labels, and since the size of the data cell is much larger than the data sub-block, such an arrangement greatly reduces the linking pointer overhead. The block cell count $C_n$ keeps a record count of the buffer utilization for each terminal. Such information is used by the microprocessor for input traffic control. When the shared buffer occupancy reaches a certain level, in order to avoid buffer overflow the microprocessor 1209 of the system of FIG. 15 selectively rejects traffic input from certain terminals.

Another important feature of the system of FIG. 15 is that the system not only is capable of multiplexing data from asynchronous terminals, but it is also capable of multiplexing data from high speed synchronous terminals for transmission over the common communication channel 1216. To handle such inputs, synchronous input terminal interface circuits, such as the terminal interface circuit 1215 are required. Each terminal interface consists of a microcomputer 1218 and a universal synchronous transmitter/receiver 1221. The microcomputer, as described, includes a processor 1216 and a first buffer memory 1217. The universal synchronous transmitter/receiver 1221 is used for handling the synchronous data in the interface 1215. The microcomputer 1218 is used for controlling the universal synchronous receiver/transmitter 1221 and for forming data sub-blocks in its memory 1217.

The synchronous data sub-block in the first buffer memory 1217 in the terminal interface 1215 has the same data structure as shown in FIG. 16. The data sub-block is transferred to the shared buffer pool 1206 of the second buffer memory by way of the direct memory access circuit 1204. The size of the data sub-blocks generated at the synchronous terminal interfaces, such as interface 1215, are much larger than those generated at the asynchronous terminal interfaces, such as interface 1214. Therefore, the data sub-blocks from the synchronous terminal 1215 are multiplexed into the common communication channel 1212 with the format shown in FIG. 18. The multiplexer/demultiplexer processor 1209 according to the traffic load (data blocks) from the asynchronous terminals 1214, schedules and multiplexes the data sub-blocks from the synchronous terminals over the communication channel for transmission to the remote locations.

To reduce address overhead, an lanternative implementation of statistical multiplexing data structure is to permit each frame of the data block to consist of data collected from a complete scan of all the asynchronous input terminals. The collected data sub-blocks are arranged according to the scanning sequence order. An address information table is assigned at the beginning of the data field. In the address information table there is an indicator bit I', and two- or three-bit byte count of sub-block size for each terminal, as shown in FIG. 17. With such an addressing scheme, only three to four bits are required to represent each data sub-block, as compared with eight bits in the data structure of FIG. 16. This represents a 50–60% reduction in address overhead. However, since the address information table overhead is fixed, that is, the indicator bits and the sub-block size counter required regardless of whether the user has a message to transmit or not, the data structure of FIG. 17 is advantageous only when all the terminals are active and have heavy traffic loads.

The scanner 1203 periodically scans the terminal interfaces 1214 and collects the full or partially full sub-blocks in the first buffer memory 1202 at the terminal interface 1214 and transfers the sub-blocks to the second buffer memory 1207 by way of the direct memory access facility 1204. The starting memory location for storing the data sub-blocks in the second buffer memory is specified by the multiplexer/demultiplexer microprocessor 1209 at the beginning of the direct memory access operation. The subsequent storage location can be determined by the direct memory access circuit 1204. The transferred data sub-block consists of byte count of that sub-block $N_i$ and the data sub-block $D_i$. The byte count $N_i$ not only is used for terminating the direct memory access operation between the first buffer memory 1202 and the second buffer memory, but also for the address information table in the data block, as shown in FIG. 17.

After the scanner 1203 performs a complete scan, the multiplexer microprocessor 1209 collects all the received sub-blocks and forms them into the desired data structure to be transmitted to the common communication channel by the transmitter portion of transmitter/receiver unit 1212. It should be noted that in this case, since the data blocks consist of sub-blocks collected from a complete scan of all the input terminals, block time-out by the counter of unit 1210 is no longer necessary, and this represents a slight simplification in the design. However, the software for handling sub-blocks is more complicated than the case of the data sub-block immediately followed by its address and byte count, as in the representation of FIG. 16. Furthermore, because of rigid data structure, priority scanning is not feasible in the latter embodiment.

It will be appreciated that although particular embodiments of the invention have been described in the specification and illustrated in the drawings, modifications may be made. It is intended in the following claims to cover all the embodiments of the invention which come within its true spirit and scope.

What is claimed is:

1. A statistical multiplexing system for transmitting user messages from a plurality of terminals to at least one remote location over at least one common communication channel, said system including: first buffer memory means for moderating the effects of statistically excessive demand, second buffer memory means for forming information from the first buffer memory means into data blocks, a plurality of interface circuits respectively connected to the terminal, means for introducing data from the terminals into said first buffer memory means, means for transferring said data from the first buffer memory means to the second buffer memory means, transmitter means for transmitting the data blocks from the second buffer memory means over the common communication channel to the remote location; receiver means coupled to the common communication channel for receiving multiplexed data blocks from at least one remote location over the common communication channel for distribution to the terminals; a demultiplexing circuit interposed between the receiver means and the terminal interface circuits for distributing the received data blocks, and microprocessor means for controlling the flow of signals between the first buffer memory means and the transmitter means for multiplexing the data blocks to be transmitted over the common communication channel, and for controlling the flow of signals from the receiver means to the demultiplexing circuit for demultiplexing data blocks received over the common communication channel by said receiver means.

2. The statistical multiplexing system defined in claim 1, and which includes first direct memory access circuit means for transferring data blocks directly from said second buffer memory means to the transmitter means.

3. The statistical multiplexing system defined in claim 1, and which includes scanner means for providing priority scanning by selectively scanning selected ones of said terminals more frequently than the other ones of said terminals.

4. The statistical multiplexing system defined in claim 1, in which each of said terminal interface circuits includes means for transmitting each correctly received data character back to the originating terminal before the data character is transmitted to the remote location.

5. The statistical multiplexing system defined in claim 1, in which said second buffer memory means includes means for forming data characters from a common terminal into data sub-blocks, and which includes means for causing the microprocessor to organize the data sub-blocks into data blocks for transmission over said common communication channel.

6. The statistical multiplexing system defined in claim 5, and which includes sub-block time-out counter means for causing said microprocessor to organize full or partially full data sub-blocks in the second buffer means into data blocks after a predetermined time established by said time-out counter means.

7. The statistical multiplexing system defined in claim 6, in which the data sub-blocks are of a fixed maximum size, and each of said sub-blocks includes an address label, a sub-block size count field, and at least one data character derived from one of said terminals.

8. The statistical multiplexing system defined in claim 5, and which includes a cycle limit counter coupled to said second buffer memory means and controlled by said microprocessor to cause an uncompleted sub-block to be chained to a data block in said second buffer memory means after a predetermined cycle limit established by said cycle limit counter.

9. The statistical multiplexing system defined in claim 1, which includes a block time-out counter circuit coupled to the microprocessor for causing the microprocessor to collect all the sub-blocks in said second buffer memory means after a predetermined time has elapsed and to cause the data sub-blocks to be formed into a data block for transmission over said common communication channel by said transmitter means.

10. The statistical multiplexing system defined in claim 1, in which said second buffer memory means collects data sub-blocks from all the terminals and forms the sub-blocks into data blocks, and in which said microprocessor causes the data blocks in the second buffer memory means to be transmitted over the common communication channel by said transmitter means when each such data block reaches a prescribed maximum size.

11. The statistical multiplexing system defined in claim 10, in which each such data block includes a frame character indicating the beginning of the data block, address information identifying the sender address and destination address, control information designating a positive or negative acknowledgement, a block sequence number, a block identifier designating control or data block, a byte count of the block size, at least one data sub-block, an error checking code, and a frame character indiciating the end of the data block.

12. The statistical multiplexing system defined in claim 1, and which includes further direct memory access means between said second buffer memory means and said transmitter means to provide direct data transfer from said second buffer memory means to said transmitter means and to provide direct data transfer from the receiver means to the second buffer memory means.

13. The statistical multiplexing system defined in claim 12, in which said further direct memory access means includes a block size counter which initiates a data transfer operation when a data block in said second buffer memory means reaches a predetermined size.

14. The statistical multiplexing system defined in claim 1, and which includes means for generating a negative acknowledgment signal for a data block incorrectly received from the remote location, and means for transmitting the negative acknowledgment message and a label indicating the last correctly received data block sequence number as an acknowledgment message to the sender over the common communication channel.

15. The statistical multiplexing system defined in claim 14, and which includes means for appending the acknowledgment messages onto data blocks transmitted over the communication channel.

16. The statistical multiplexing system defined in claim 1, and which includes means for introducing control blocks to said transmitter means for transmission over said common communication channel, said control blocks including an identifying character to distinguish control blocks from data blocks.

17. The statistical multiplexing system defined in claim 1, in which said demultiplexing circuit includes means for processing data blocks received by said receiver means to derive a plurality of data characters; and means including output buffer means for distributing said data characters to designated ones of said terminal interface circuits.

18. The statistical multiplexing system defined in claim 1, and which includes memory buffer means controlled by said microprocessor for demultiplexing the received multiplexed data blocks, said memory means including an individual dedicated buffer for each of the terminals.

19. The statistical multiplexing system defined in claim 18, in which said last-named memory buffer means includes a shared buffer pool for storing overflow traffic when said dedicated buffers are full.

20. The statistical multiplexing system defined in claim 19, in which the shared buffer pool is partitioned into a plurality of data cells each of which has a capacity for storing a plurality of data sub-blocks from the same terminal, means for forming address pointers and buffer occupancy count for each of the terminals, and means forming link pointers to link together all the data cells to one of the dedicated buffers and for data output of a particular terminal.

21. The statistical multiplexing system defined in claim 20, in which the microprocessor includes means for outputting a special control character to at least one of the terminals temporarily to disable inputs to that terminal when the shared buffer pool reaches a predetermined level.

22. The statistical multiplexing system defined in claim 20, in which the microprocessor includes means for outputting a control message to a particular terminal temporarily to reject inputs from such terminal when the input traffic therefrom exceeds a predetermined level.

23. The statistical multiplexing system defined in claim 1, and which includes means for introducing a destination address identifier to each of said data blocks, and for transmitting the data blocks to distinctive destinations as specified by the destination address.

24. The statistical multiplexing system defined in claim 1, in which said transmitter means includes means for generating and transmitting distinctive signals over the communication channel during the absence of transmission of data blocks to indicate that the transmission channel is in an idle state.

25. The statistical multiplexing system defined in claim 1, in which said first buffer memory means is formed by a plurality of separate memories respectively included in said terminal interface circuits.

26. The statistical multiplexing system defined in claim 25, and in which said scanning means periodically transfers data sub-blocks from the first buffer memory means in each of said terminal interface circuits to said second buffer memory means, and in which said microprocessor means causes said second buffer memory to organize the data into data blocks for transmission over the common communication channel by said transmitter means.

27. The statistical multiplexing system defined in claim 26, in which said second buffer memory means includes a separate dedicated buffer for each of said terminal interface circuits, in which said demultiplexing circuit includes means for distributing data blocks received from the remote location into the corresponding dedicated buffer means, and in which said scanning means periodically transfers data sub-blocks from the second buffer memory means selectively into the first buffer memory means in the individual terminal interface circuits.

28. The statistical multiplexing system defined in claim 26, and which includes direct memory access means for transferring data sub-blocks from said first buffer memory in each of said terminal interface circuits to said second buffer memory means.

29. The statistical multiplexing system defined in claim 27, and which includes direct memory access means for transferring data characters from the dedicated output buffers of the second buffer memory means selectively to the first buffer memory means of the terminal interface circuits for the distribution of data of the respective terminals.

30. The statistical multiplexing system defined in claim 26, and which includes means controlled by the microprocessor means for disabling the transfer of data sub-blocks from the first buffer memory of a particular terminal interface circuit to the second buffer memory means when the input traffic from the corresponding terminal exceeds a predetermined level.

31. The statistical multiplexing system defined in claim 1, in which the data blocks each comprise an address information table consisting of a sub-block indicator bit for each of said terminals and a byte count of the sub-block size for each of said terminals, and in which the sub-blocks are ordered in a fixed sequence.

32. The statistical multiplexing system defined in claim 31, wherein said transferring means transfers data sub-blocks from the first buffer memory means to the second buffer memory means, each of said sub-blocks including a sub-block size byte count to facilitate the transfer thereof from the first buffer memory means to the second buffer memory means.

33. The statistical multiplexing system defined in claim 31, and in which said scanning means scans the terminal interface circuits at fixed time intervals to effect the transfer of full or partially full data sub-blocks from the first buffer memory means to the second buffer memory means, thereby to enable the data sub-blocks to be collected at the second buffer memory means in a fixed sequence order coinciding with the order of the address information table.

34. The statistical multiplexing system defined in claim 1, and which includes a plurality of asynchronous input terminals and a plurality of synchronous input terminals, and in which said first buffer memory means is formed by a plurality of separate memories respectively included in said terminal interface circuits, and which includes direct memory access circuit means for data input/output to the second buffer memory means, and means deriving data from the first buffer memory means in the terminal interface circuits connected to said synchronous input terminals and for transferring the data to the second buffer memory means by way of the direct memory access circuit means.

35. The statistical multiplexing system defined in claim 1, and which includes in each of said terminal interface circuits microcomputer means comprising processor means and memory means to form data characters from the terminals corresponding to said terminal interface circuits into data sub-blocks, the memories of the microcomputer means forming said first buffer memory means.

36. The statistical multiplexing system defined in claim 35, in which each of said terminal interface circuits further includes a universal synchronous receiver/transmitter to assist in the processing of signals therethrough from serial-to-parallel and from parallel-to-serial formats.

37. A statistical multiplexing system for transmitting user messages from a plurality of terminals to at least one remote location over at least one common communication channel, said system comprising: buffer means for moderating the effects of statistically excessive demand; means for introducing data from the terminals into the buffer means to be formed into data blocks; transmitter means for transmitting data blocks from the buffer memory means over the common communication channel to the remote location; microprocessor means for controlling system signal flow; said buffer means including first buffer memory means for receiving and storing the data from the terminals; and said buffer means further including a second buffer memory means controlled by said microprocessor means for receiving data from the first buffer memory means and for forming the data into data blocks for transmission over the common communication channels by said transmitter means.

38. The statistical multiplexing system defined in claim 37, in which said second buffer memory means includes means for forming characters from the same terminal into data sub-blocks and for subsequently forming the data sub-blocks into a data block for transmission by said transmitter means over said common communication channel.

39. The statistical multiplexing system defined in claim 37, and which includes a plurality of terminal interface circuits interposed between respective ones of said terminals and said scanner means for converting serial data streams from the corresponding terminals into a parallel format.

40. The statistical multiplexing system defined in claim 39, in which each of said terminal interface circuits includes parity error checking means for echoing properly received characters back to the originating terminals.

41. The statistical multiplexing system defined in claim 37, in which said scanner means includes a scanner section for successively selecting certain ones of said terminals, and in which said scanner means includes a priority section for selecting others of said terminals on a priority basis upon an indication that any one of said other terminals has a data character available.

42. The statistical multiplexing system defined in claim 38, and which includes a block time-out counter circuit coupled to the microprocessor means for causing the microprocessor means to organize the data sub-blocks in said second buffer memory means after a predetermined time has elapsed and to cause the sub-blocks to be formed into data blocks for transmission over said common communication line by said transmitter means.

43. The statistical multiplexing system defined in claim 37, and which includes receiver means coupled to the common communication line for receiving data blocks from the remote location for distribution to designated ones of said terminals.

44. The statistical multiplexing system defined in claim 43, and in which said receiver means includes means for checking the received data blocks for errors, and status register means coupled to said receiver means for informing said microprocessor means when an error has occured.

45. The statistical multiplexing system defined in claim 44, and which includes acknowledgment time-out counter circuit means coupled to the microprocessor means for enabling the microprocessor means to cause an acknowledgment block to be retransmitted over said communication line to the remote location.

46. The statistical multiplexing system defined in claim 43, and which includes output buffer and demultiplexer means coupled to said receiver means for processing data blocks received by said receiver means and for deriving data characters therefrom.

47. The statistical multiplexing system defined in claim 46, and which includes a plurality of terminal interface circuits interposed between said output buffer means and said terminals for receiving the data character from said output buffer means and for distributing said data characters to designated ones of said terminals.

48. The statistical multiplexing system defined in claim 37, and which includes means for introducing control blocks to said transmitter means for transmission over said common communication channel, the control block being distinguished from the data block by a unique block identifier.

49. The statistical multiplexing system defined in claim 45, and which includes means for forming characters from a common terminal into data sub-blocks, and in which said time-out counter means causes the microprocessor means to generate an acknowledgment sub-block to be formed with the data sub-blocks into a block for transmission over said common communication channel, and which includes means for appending a special address label to the acknowledgment sub-block to distinguish it from the data sub-blocks.

* * * * *